United States Patent
Hosseini et al.

(10) Patent No.: US 10,680,698 B2
(45) Date of Patent: Jun. 9, 2020

(54) UPLINK CONTROL INFORMATION MAPPING ON A SHORTENED UPLINK SHARED CHANNEL

(71) Applicant: QUALCOMM Incorporated, San Diego, CA (US)

(72) Inventors: Seyedkianoush Hosseini, San Diego, CA (US); Amir Farajidana, Sunnyvale, CA (US); Young Geun Cho, Palo Alto, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 16/169,318

(22) Filed: Oct. 24, 2018

(65) Prior Publication Data

US 2019/0132038 A1 May 2, 2019

Related U.S. Application Data

(60) Provisional application No. 62/579,873, filed on Oct. 31, 2017.

(51) Int. Cl.
*H04B 7/02* (2018.01)
*H04B 7/06* (2006.01)
(Continued)

(52) U.S. Cl.
CPC .......... *H04B 7/0632* (2013.01); *H04B 7/063* (2013.01); *H04B 17/382* (2015.01);
(Continued)

(58) Field of Classification Search
CPC .... H04B 7/0632; H04B 17/382; H04B 7/063; H04L 1/1861; H04L 1/1671;
(Continued)

(56) References Cited

U.S. PATENT DOCUMENTS

| | | |
|---|---|---|
| 2013/0238954 A1 | 9/2013 | Jang et al. |
| 2016/0028518 A1 | 1/2016 | Zhao et al. |

(Continued)

OTHER PUBLICATIONS

Huawei Hisilicon: "sUCI on sPUSCH", 3GPP Draft, R1-1611162, 3rd Generation Partnership Project (3GPP), Mobile Competence Centre, 650, Route Des Lucioles, F-06921 Sophia-Antipolis Cedex, France, vol. RAN WG1, No. Reno, USA, Nov. 14, 2016-Nov. 18, 2014, Nov. 13, 2016 (Nov. 13, 2016), 3 Pages, Retrieved from the Internet: URL:http://www.3gpp.org/ftp/Meetings_3GPP_SYNC/RAN1/Docs/ [retrieved on Nov. 13, 2016].

(Continued)

*Primary Examiner* — Don N Vo
(74) *Attorney, Agent, or Firm* — Holland & Hart LLP/Qualcomm

(57) ABSTRACT

Methods, systems, and devices for wireless communications are described. A UE may configure a physical uplink shared channel (PUSCH) using shortened transmission time intervals (sTTIs), which may be referred to as a shortened PUSCH (sPUSCH), to transmit uplink control information (UCI) to a base station or other wireless device. The UE may use mapping rules, which may be based at least in part on a number of data symbols included in the sPUSCH, to map different types of UCI to different resource elements (REs) within the sPUSCH. A base station or other wireless device may use mapping rules, which may be based at least in part on a number of data symbols included in an sPUSCH, to determine one or more REs within the sPUSCH to monitor for different types of UCI.

37 Claims, 17 Drawing Sheets

(51) Int. Cl.

| | |
|---|---|
| *H04L 1/16* | (2006.01) |
| *H04W 48/18* | (2009.01) |
| *H04L 5/00* | (2006.01) |
| *H04W 72/04* | (2009.01) |
| *H04B 17/382* | (2015.01) |
| *H04L 1/18* | (2006.01) |

(52) U.S. Cl.
CPC .......... *H04L 1/1614* (2013.01); *H04L 1/1671* (2013.01); *H04L 1/1861* (2013.01); *H04L 5/0048* (2013.01); *H04W 48/18* (2013.01); *H04W 72/0413* (2013.01); *H04L 5/0055* (2013.01); *H04W 72/0446* (2013.01)

(58) Field of Classification Search
CPC ... H04L 5/0048; H04L 1/1614; H04L 5/0055; H04W 72/0413; H04W 48/18
USPC .................................................. 375/262, 267
See application file for complete search history.

(56) References Cited

U.S. PATENT DOCUMENTS

| | | | |
|---|---|---|---|
| 2017/0318575 A1* | 11/2017 | Park ................. | H04W 72/0413 |
| 2019/0007182 A1* | 1/2019 | Li ....................... | H04L 1/1854 |
| 2019/0045556 A1* | 2/2019 | Bagheri ............. | H04W 72/1289 |
| 2019/0116611 A1* | 4/2019 | Lee .................... | H04W 72/1278 |
| 2019/0141736 A1* | 5/2019 | Suzuki ................ | H04L 1/1812 |
| 2019/0190663 A1* | 6/2019 | Sahlin ................. | H04L 1/1887 |

OTHER PUBLICATIONS

International Search Report and Written Opinion—PCT/US2018/057530—ISA/EPO—dated Jan. 21, 2019.

Potevio: "Discussion on UCI on sPUSCH", 3GPP Draft, R1-1714201 Discussion on UCI on sPUSCH, 3rd Generation Partnership Project (3GPP), Mobile Competence Centre, 650, Route Des Lucioles, F-06921 Sophia-Antipolis Cedex , France, vol. RAN WG1, No. Prague, Czech Republic, Aug. 21, 2017-Aug. 25, 2017, Aug. 20, 2017 (Aug. 20, 2017), 3 Pages, Retrieved from the Internet: URL:http://www.3gpp.org/ftp/Meetings_3GPP SYNC/RAN1/Docs/ [retrieved on Aug. 20, 2017].

* cited by examiner

| Possible Patterns for an sPUSCH in sTTI *n* | | | | | |
|---|---|---|---|---|---|
| sTTI 0 | sTTI 1 | sTTI 2 | sTTI 3 | sTTI 4 | sTTI 5 |
| RDD<br>DDR | RD<br>DR<br>DD<br>DD \| R | RD<br>DD | RD<br>DR<br>DD \| R | RD<br>DR<br>DD<br>DD \| R | RDD |

R = Reference Symbol
D = Data Symbol
\| R = Corresponding Reference Symbol is in Subsequent sTTI

UPLINK CONTROL INFORMATION MAPPING ON A SHORTENED UPLINK SHARED CHANNEL

CROSS REFERENCES

The present Application for patent claims the benefit of U.S. Provisional Patent Application No. 62/579,873 by HOSSEINI et al., entitled "UPLINK CONTROL INFORMATION MAPPING ON A SHORTENED UPLINK SHARED CHANNEL," filed Oct. 31, 2017, assigned to the assignee hereof, and expressly incorporated by reference in its entirety.

BACKGROUND

The following relates generally to wireless communication, and more specifically to uplink control information mapping on a shortened uplink shared channel.

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as a Long Term Evolution (LTE) systems or LTE-Advanced (LTE-A) systems, and fifth generation (5G) systems which may be referred to as New Radio (NR) systems. These systems may employ technologies such as code division multiple access (CDMA), time division multiple access (TDMA), frequency division multiple access (FDMA), orthogonal frequency division multiple access (OFDMA), or discrete Fourier transform-spread-OFDM (DFT-S-OFDM). A wireless multiple-access communications system may include a number of base stations or network access nodes, each simultaneously supporting communication for multiple communication devices, which may be otherwise known as user equipment (UE).

In some wireless communications systems (e.g., NR systems), a UE may communicate with a base station on a carrier using shortened transmission time intervals (sTTIs). The base station may transmit uplink control information (UCI) on the carrier using a shortened physical uplink shared channel (sPUSCH). Techniques for mapping UCI to resource elements (REs) within an sPUSCH may be desired.

SUMMARY

The described techniques relate to improved methods, systems, devices, or apparatuses that support uplink control information (UCI) mapping on a shortened uplink shared channel, such as a shortened physical uplink shared channel (sPUSCH). Generally, the described techniques provide for mapping UCI to resource elements (REs) within an sPUSCH that includes either one or two symbols (e.g., one or two orthogonal frequency-division multiplexing (OFDM) symbols) allocated to data.

A symbol within an sPUSCH allocated to data may be referred to as a data symbol and may comprise a plurality of REs that span a frequency range. For example, a data symbol may comprise a lowest-frequency RE, a highest-frequency RE, and any number of additional REs at frequencies between the low and high end of the frequency range. Along with one or more data symbols, some sPUSCHs may also include a symbol allocated to reference data (e.g., demodulation reference signal (DMRS) data), which may be referred to as a reference symbol.

When configuring an sPUSCH for transmission, a UE may identify a number of data symbols included in the sPUSCH (e.g., one data symbol or two data symbols) and may select a mapping rule for the sPUSCH based at least in part on the identified number of data symbols (e.g., a first mapping rule is the sPUSCH includes one data symbol and a second mapping rule if the sPUSCH includes two data symbols). The UE may map UCI to various REs within the one or two data symbols of the sPUSCH according to the selected mapping rule, then transmit the UCI to a base station via the sPUSCH. UCI may comprise, for example, acknowledgement (ACK/NACK) data indicating a successful or unsuccessful decoding by the UE of a packet received by the UE, rank indication (RI) data, channel quality indication (CQI) data, any combination thereof, or any other type of UCI.

A base station may similarly use mapping rules based at least in part on the number of data symbols included in the sPUSCH to determine one or more REs within the sPUSCH to monitor for UCI.

A method of wireless communication is described. The method may include identifying a number of data symbols included in an sPUSCH, selecting a mapping rule for the sPUSCH based at least in part on the identified number of data symbols, mapping UCI to REs within the sPUSCH according to the selected mapping rule, and transmitting the UCI via the sPUSCH.

An apparatus for wireless communication is described. The apparatus may include means for identifying a number of data symbols included in an sPUSCH, means for selecting a mapping rule for the sPUSCH based at least in part on the identified number of data symbols, means for mapping UCI to REs within the sPUSCH according to the selected mapping rule, and means for transmitting the UCI via the sPUSCH.

Another apparatus for wireless communication is described. The apparatus may include a processor, memory in electronic communication with the processor, and instructions stored in the memory. The instructions may be operable to cause the processor to identify a number of data symbols included in an sPUSCH, select a mapping rule for the sPUSCH based at least in part on the identified number of data symbols, map UCI to REs within the sPUSCH according to the selected mapping rule, and transmit the UCI via the sPUSCH.

A non-transitory computer-readable medium for wireless communication is described. The non-transitory computer-readable medium may include instructions operable to cause a processor to identify a number of data symbols included in an sPUSCH, select a mapping rule for the sPUSCH based at least in part on the identified number of data symbols, map UCI to REs within the sPUSCH according to the selected mapping rule, and transmit the UCI via the sPUSCH.

In some examples of the method, apparatus, and non-transitory computer-readable medium described above, the identified number of data symbols may be one. In some examples of the method, apparatus, and non-transitory computer-readable medium described above, mapping the UCI to REs within the sPUSCH according to the selected mapping rule comprises mapping ACK/NACK data included within the UCI in accordance with a first priority level. Some examples of the method, apparatus, and non-transitory computer-readable medium described above may further include processes, features, means, or instructions for mapping RI data included within the UCI in accordance with a second priority level that may be lower than the first priority level.

In some examples of the method, apparatus, and non-transitory computer-readable medium described above, mapping the UCI to REs within the sPUSCH according to the selected mapping rule further comprises mapping CQI data included within the UCI in accordance with a third priority level that may be lower than the second priority level. Some examples of the method, apparatus, and non-transitory computer-readable medium described above may further include processes, features, means, or instructions for mapping user data scheduled for the sPUSCH in accordance with a fourth priority level that may be lower than the third priority level.

In some examples of the method, apparatus, and non-transitory computer-readable medium described above, mapping the UCI to REs within the sPUSCH according to the selected mapping rule further comprises mapping the CQI data and the RI data included within the UCI in accordance with a rate-matching procedure. In some examples of the method, apparatus, and non-transitory computer-readable medium described above, mapping the UCI to REs within the sPUSCH according to the selected mapping rule further comprises mapping the ACK/NACK data included within the UCI in accordance with a puncturing procedure.

Some examples of the method, apparatus, and non-transitory computer-readable medium described above may further include processes, features, means, or instructions for determining that a number of REs included in a data symbol of the sPUSCH may be insufficient to carry all the RI data included within the UCI and all the ACK/NACK data included within the UCI. Some examples of the method, apparatus, and non-transitory computer-readable medium described above may further include processes, features, means, or instructions for puncturing at least a portion of the RI data included within the UCI in favor of at least a portion of the ACK/NACK data included within the UCI.

Some examples of the method, apparatus, and non-transitory computer-readable medium described above may further include processes, features, means, or instructions for determining that a number of REs included in a data symbol of the sPUSCH may be sufficient to carry all the RI data included within the UCI and all the ACK/NACK data included within the UCI. Some examples of the method, apparatus, and non-transitory computer-readable medium described above may further include processes, features, means, or instructions for mapping the ACK/NACK data included within the UCI to one or more REs comprising a third starting position, the third starting position adjacent in frequency to a last RE allocated to RI data.

Some examples of the method, apparatus, and non-transitory computer-readable medium described above may further include processes, features, means, or instructions for determining that a number of REs included in a data symbol of the sPUSCH may be sufficient to carry all the RI data included within the UCI and all the ACK/NACK data included within the UCI. Some examples of the method, apparatus, and non-transitory computer-readable medium described above may further include processes, features, means, or instructions for determining that the number of REs included in the data symbol of the sPUSCH may be insufficient to carry all the RI data included within the UCI, all the ACK/NACK data included within the UCI, and all CQI data included within the UCI. Some examples of the method, apparatus, and non-transitory computer-readable medium described above may further include processes, features, means, or instructions for puncturing at least a portion of the CQI data included within the UCI in favor of at least a portion of the ACK/NACK data included within the UCI.

Some examples of the method, apparatus, and non-transitory computer-readable medium described above may further include processes, features, means, or instructions for determining that a number of REs included in a data symbol of the sPUSCH may be sufficient to carry all the RI data included within the UCI, all the ACK/NACK data included within the UCI, and all CQI data included within the UCI. Some examples of the method, apparatus, and non-transitory computer-readable medium described above may further include processes, features, means, or instructions for mapping user data scheduled for the sPUSCH to one or more REs included in the data symbol of the sPUSCH.

In some examples of the method, apparatus, and non-transitory computer-readable medium described above, mapping the UCI to REs within the sPUSCH according to the selected mapping rule further comprises mapping CQI data included within the UCI to one or more REs comprising a first fixed starting position. Some examples of the method, apparatus, and non-transitory computer-readable medium described above may further include processes, features, means, or instructions for mapping RI data included within the UCI to one or more REs comprising a second fixed starting position.

In some examples of the method, apparatus, and non-transitory computer-readable medium described above, the first fixed starting position may be a highest-frequency RE within a data symbol of the sPUSCH.

In some examples of the method, apparatus, and non-transitory computer-readable medium described above, the second fixed starting position may be a lowest-frequency RE within a data symbol of the sPUSCH.

In some examples of the method, apparatus, and non-transitory computer-readable medium described above, the identified number of data symbols may be two. In some examples of the method, apparatus, and non-transitory computer-readable medium described above, mapping the UCI to REs within the sPUSCH according to the selected mapping rule comprises mapping ACK/NACK data included within the UCI to a first data symbol of the sPUSCH, the first data symbol of the sPUSCH selected to necessarily be adjacent in time to a reference symbol allocated to reference data for decoding the sPUSCH. Some examples of the method, apparatus, and non-transitory computer-readable medium described above may further include processes, features, means, or instructions for mapping RI data included within the UCI to a second data symbol of the sPUSCH.

In some examples of the method, apparatus, and non-transitory computer-readable medium described above, the reference symbol may be within a same sTTI as the first data symbol of the sPUSCH.

In some examples of the method, apparatus, and non-transitory computer-readable medium described above, the first data symbol of the sPUSCH may be within a first sTTI and the reference symbol may be within a second sTTI that may be different from the first sTTI.

In some examples of the method, apparatus, and non-transitory computer-readable medium described above, the reference data comprises DMRS data.

Some examples of the method, apparatus, and non-transitory computer-readable medium described above may further include processes, features, means, or instructions for mapping the ACK/NACK data included within the UCI to one or more REs comprising a lowest-frequency RE within the first data symbol.

Some examples of the method, apparatus, and non-transitory computer-readable medium described above may further include processes, features, means, or instructions for mapping the RI data included within the UCI to one or more REs comprising a lowest-frequency RE within the second data symbol.

Some examples of the method, apparatus, and non-transitory computer-readable medium described above may further include processes, features, means, or instructions for mapping CQI data included within the UCI to one or more REs comprising a highest-frequency RE within the first data symbol, within the second data symbol, or within both the first data symbol and the second data symbol.

A method of wireless communication is described. The method may include determining a number of data symbols included in an sPUSCH, identifying a mapping rule for the sPUSCH based at least in part on the determined number of data symbols, determining, based at least in part on the identified mapping rule, one or more REs within the sPUSCH to monitor for UCI, and monitoring the one or more REs for the UCI.

An apparatus for wireless communication is described. The apparatus may include means for determining a number of data symbols included in an sPUSCH, means for identifying a mapping rule for the sPUSCH based at least in part on the determined number of data symbols, means for determining, based at least in part on the identified mapping rule, one or more REs within the sPUSCH to monitor for UCI, and means for monitoring the one or more REs for the UCI.

Another apparatus for wireless communication is described. The apparatus may include a processor, memory in electronic communication with the processor, and instructions stored in the memory. The instructions may be operable to cause the processor to determine a number of data symbols included in an sPUSCH, identify a mapping rule for the sPUSCH based at least in part on the determined number of data symbols, determine, based at least in part on the identified mapping rule, one or more REs within the sPUSCH to monitor for UCI, and monitor the one or more REs for the UCI.

A non-transitory computer-readable medium for wireless communication is described. The non-transitory computer-readable medium may include instructions operable to cause a processor to determine a number of data symbols included in an sPUSCH, identify a mapping rule for the sPUSCH based at least in part on the determined number of data symbols, determine, based at least in part on the identified mapping rule, one or more REs within the sPUSCH to monitor for UCI, and monitor the one or more REs for the UCI.

In some examples of the method, apparatus, and non-transitory computer-readable medium described above, the determined number of data symbols may be one. In some examples of the method, apparatus, and non-transitory computer-readable medium described above, determining, based at least in part on the identified mapping rule, one or more REs within the sPUSCH to monitor for UCI comprises determining one or more REs comprising a fixed starting position within a data symbol of the sPUSCH to monitor for RI data.

Some examples of the method, apparatus, and non-transitory computer-readable medium described above may further include processes, features, means, or instructions for determining that a RE corresponding to the fixed starting position comprises RI data. Some examples of the method, apparatus, and non-transitory computer-readable medium described above may further include processes, features, means, or instructions for identifying a second RE within the data symbol of the sPUSCH that may be nearest in frequency to the fixed starting position and that lacks RI data. Some examples of the method, apparatus, and non-transitory computer-readable medium described above may further include processes, features, means, or instructions for monitoring the second RE for ACK/NACK data.

Some examples of the method, apparatus, and non-transitory computer-readable medium described above may further include processes, features, means, or instructions for determining that a RE corresponding to the fixed starting position lacks RI data. Some examples of the method, apparatus, and non-transitory computer-readable medium described above may further include processes, features, means, or instructions for determining whether the RE corresponding to the fixed starting position comprises ACK/NACK data.

In some examples of the method, apparatus, and non-transitory computer-readable medium described above, the fixed starting position may be a lowest-frequency RE within the data symbol of the sPUSCH.

Some examples of the method, apparatus, and non-transitory computer-readable medium described above may further include processes, features, means, or instructions for determining one or more REs comprising a second fixed starting position within the data symbol of the sPUSCH to monitor for CQI data.

In some examples of the method, apparatus, and non-transitory computer-readable medium described above, the second fixed starting position may be a highest-frequency RE within the data symbol of the sPUSCH.

In some examples of the method, apparatus, and non-transitory computer-readable medium described above, the determined number of data symbols may be two. In some examples of the method, apparatus, and non-transitory computer-readable medium described above, determining, based at least in part on the identified mapping rule, one or more REs within the sPUSCH to monitor for UCI comprises determining a reference symbol allocated to reference data for decoding the sPUSCH. Some examples of the method, apparatus, and non-transitory computer-readable medium described above may further include processes, features, means, or instructions for determining a first data symbol of the sPUSCH, the first data symbol of the sPUSCH adjacent in time to the reference symbol, to monitor for ACK/NACK data. Some examples of the method, apparatus, and non-transitory computer-readable medium described above may further include processes, features, means, or instructions for determining a second data symbol of the sPUSCH to monitor for RI data.

In some examples of the method, apparatus, and non-transitory computer-readable medium described above, the reference symbol may be within a same sTTI as the first data symbol of the sPUSCH.

In some examples of the method, apparatus, and non-transitory computer-readable medium described above, the first data symbol of the sPUSCH may be within a first sTTI and the reference symbol may be within a second sTTI that may be different from the first sTTI.

In some examples of the method, apparatus, and non-transitory computer-readable medium described above, the reference data comprises DMRS data.

Some examples of the method, apparatus, and non-transitory computer-readable medium described above may further include processes, features, means, or instructions for determining one or more REs comprising a lowest-frequency RE within the first data symbol to monitor for the ACK/NACK data.

Some examples of the method, apparatus, and non-transitory computer-readable medium described above may further include processes, features, means, or instructions for determining one or more REs comprising a lowest-frequency RE within the second data symbol to monitor for the RI data.

Some examples of the method, apparatus, and non-transitory computer-readable medium described above may further include processes, features, means, or instructions for determining one or more REs comprising a highest-frequency RE within first data symbol, within the second data symbol, or within both the first data symbol and the second data symbol to monitor for CQI data.

BRIEF DESCRIPTION OF THE DRAWINGS

FIG. 2 illustrates an example of shortened physical uplink shared channel (sPUSCH) formats that support uplink control information mapping on a shortened uplink shared channel in accordance with aspects of the present disclosure.

DETAILED DESCRIPTION

Figure 1:
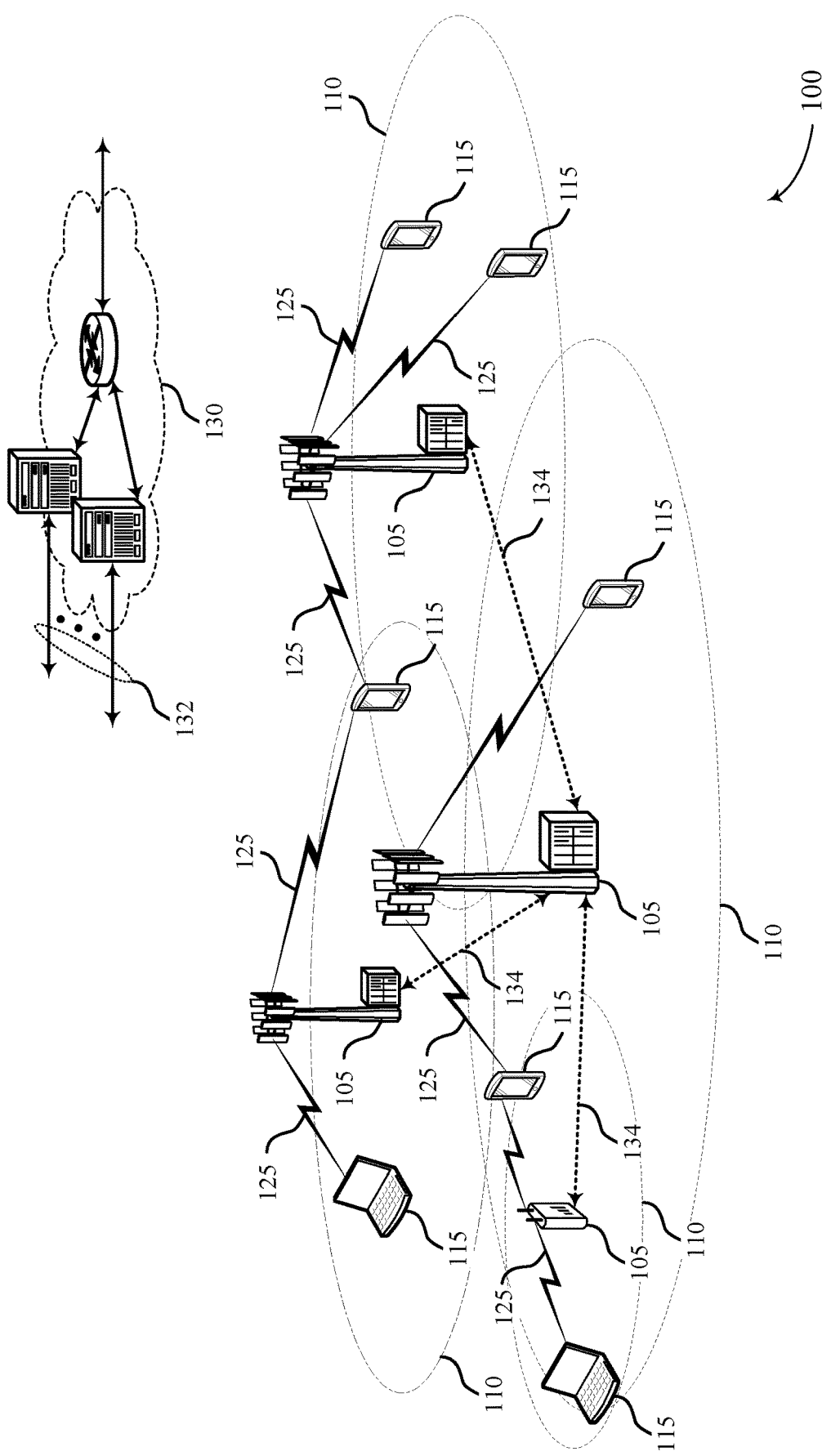
FIG. 1 illustrates an example of a system for wireless communication that supports uplink control information mapping on a shortened uplink shared channel in accordance with aspects of the present disclosure.

The described techniques relate to improved methods, systems, devices, or apparatuses that support uplink control information (UCI) mapping on a shortened uplink shared channel, such as a shortened physical uplink shared channel (sPUSCH). Generally, the described techniques provide for mapping UCI to resource elements (REs) within an sPUSCH that includes either one or two symbols (e.g., one or two orthogonal frequency-division multiplexing (OFDM) symbols) allocated to data.

A symbol within an sPUSCH allocated to data may be referred to as a data symbol and may comprise a plurality of REs that span a frequency range. For example, a data symbol may comprise a lowest-frequency RE, a highest-frequency RE, and any number of additional REs at frequencies between the low and high end of the frequency range. Along with one or more data symbols, some sPUSCHs may also include a symbol allocated to reference data (e.g, demodulation reference signal (DMRS) data), which may be referred to as a reference symbol.

When configuring an sPUSCH for transmission, a user equipment (UE) may identify a number of data symbols included in the sPUSCH (e.g., one data symbol or two data symbols) and may select a mapping rule for the sPUSCH based at least in part on the identified number of data symbols (e.g., a first mapping rule is the sPUSCH includes one data symbol and a second mapping rule if the sPUSCH includes two data symbols). The UE may map UCI to various REs within the one or two data symbols of the sPUSCH according to the selected mapping rule, then transmit the UCI to a base station via the sPUSCH.

UCI may comprise, for example, acknowledgement (ACK/NACK) data that indicates a successful or unsuccessful decoding by the UE of a packet received by the UE. UCI may also comprise, for example, rank indication (RI) data, which may comprise, for example, information on which transmission resources a base station should preferably use for downlink transmissions to the UE. UCI may also comprise, for example, channel quality indication (CQI) data, which may comprise, for example, information regarding which modulating and coding scheme a base station should preferably use for downlink transmissions to the UE.

A base station may also use mapping rules based at least in part on the number of data symbols included in the sPUSCH. For example, the base station may use mapping rules based at least in part on the number of data symbols included in the sPUSCH to determine one or more REs within the sPUSCH to monitor for UCI.

The mapping rules described herein may beneficially allow a UE to puncture as many REs as necessary within a data symbol of an sPUSCH to accommodate ACK/NACK data, which may provide reliability and latency benefits for hybrid automatic repeat request (HARQ) procedures. The mapping rules described herein may also beneficially provide fixed starting positions (e.g., fixed RE locations, such as fixed RE frequencies) within a data symbol of an sPUSCH for RI data and CQI data, which may provide latency and processing efficiency benefits for a base station or other wireless device that receives the sPUSCH. The mapping rules described herein may also beneficially provide a flexible but predictable starting position for ACK/NACK data within a data symbol of an sPUSCH, which may similarly provide latency and processing efficiency benefits for a base station or other wireless device that receives the sPUSCH as well as reliability and latency benefits for HARQ procedures. The benefits explicitly mentioned herein are in no way limiting, and one of ordinary skill in the art may appreciate further benefits of the mapping rules and other techniques and structures described herein.

Aspects of the disclosure are initially described in the context of a wireless communications system. Aspects of the disclosure are further illustrated by and described with reference to tables, example UCI mappings, apparatus diagrams, system diagrams, and flowcharts that relate to uplink control information mapping on a shortened uplink shared channel.

FIG. 1 illustrates an example of a wireless communications system 100 in accordance with various aspects of the present disclosure. The wireless communications system 100 includes base stations 105, UEs 115, and a core network 130. In some examples, the wireless communications system 100 may be a Long Term Evolution (LTE) network, an LTE-Advanced (LTE-A) network, or a New Radio (NR) network. In some cases, wireless communications system 100 may support enhanced broadband communications, ultra-reliable (e.g., mission critical) communications, low latency communications, or communications with low-cost and low-complexity devices.

Base stations 105 may wirelessly communicate with UEs 115 via one or more base station antennas. Base stations 105 described herein may include or may be referred to by those skilled in the art as a base transceiver station, a radio base station, an access point, a radio transceiver, a NodeB, an eNodeB (eNB), a next-generation Node B or giga-nodeB (either of which may be referred to as a gNB), a Home NodeB, a Home eNodeB, or some other suitable terminology. Wireless communications system 100 may include base stations 105 of different types (e.g., macro or small cell base stations). The UEs 115 described herein may be able to communicate with various types of base stations 105 and network equipment including macro eNBs, small cell eNBs, gNBs, relay base stations, and the like.

Each base station 105 may be associated with a particular geographic coverage area 110 in which communications with various UEs 115 is supported. Each base station 105 may provide communication coverage for a respective geographic coverage area 110 via communication links 125, and communication links 125 between a base station 105 and a UE 115 may utilize one or more carriers. Communication links 125 shown in wireless communications system 100 may include uplink transmissions from a UE 115 to a base station 105, or downlink transmissions, from a base station 105 to a UE 115. Downlink transmissions may also be called forward link transmissions while uplink transmissions may also be called reverse link transmissions.

The geographic coverage area 110 for a base station 105 may be divided into sectors making up only a portion of the geographic coverage area 110, and each sector may be associated with a cell. For example, each base station 105 may provide communication coverage for a macro cell, a small cell, a hot spot, or other types of cells, or various combinations thereof. In some examples, a base station 105 may be movable and therefore provide communication coverage for a moving geographic coverage area 110. In some examples, different geographic coverage areas 110 associated with different technologies may overlap, and overlapping geographic coverage areas 110 associated with different technologies may be supported by the same base station 105 or by different base stations 105. The wireless communications system 100 may include, for example, a heterogeneous LTE/LTE-A or NR network in which different types of base stations 105 provide coverage for various geographic coverage areas 110.

The term "cell" refers to a logical communication entity used for communication with a base station 105 (e.g., over a carrier), and may be associated with an identifier for distinguishing neighboring cells (e.g., a physical cell identifier (PCID), a virtual cell identifier (VCID)) operating via the same or a different carrier. In some examples, a carrier may support multiple cells, and different cells may be configured according to different protocol types (e.g., machine-type communication (MTC), narrowband Internet-of-Things (NB-IoT), enhanced mobile broadband (eMBB), or others) that may provide access for different types of devices. In some cases, the term "cell" may refer to a portion of a geographic coverage area 110 (e.g., a sector) over which the logical entity operates.

UEs 115 may be dispersed throughout the wireless communications system 100, and each UE 115 may be stationary or mobile. A UE 115 may also be referred to as a mobile device, a wireless device, a remote device, a handheld device, or a subscriber device, or some other suitable terminology, where the "device" may also be referred to as a unit, a station, a terminal, or a client. A UE 115 may also be a personal electronic device such as a cellular phone, a personal digital assistant (PDA), a tablet computer, a laptop computer, or a personal computer. In some examples, a UE 115 may also refer to a wireless local loop (WLL) station, an Internet of Things (IoT) device, an Internet of Everything (IoE) device, or an MTC device, or the like, which may be implemented in various articles such as appliances, vehicles, meters, or the like.

Base stations 105 may communicate with the core network 130 and with one another. For example, base stations 105 may interface with the core network 130 through backhaul links 132 (e.g., via an Si or other interface). Base stations 105 may communicate with one another over backhaul links 134 (e.g., via an X2 or other interface) either directly (e.g., directly between base stations 105) or indirectly (e.g., via core network 130).

The core network 130 may provide user authentication, access authorization, tracking, Internet Protocol (IP) connectivity, and other access, routing, or mobility functions. The core network 130 may be an evolved packet core (EPC), which may include at least one mobility management entity (MME), at least one serving gateway (S-GW), and at least one Packet Data Network (PDN) gateway (P-GW). The MME may manage non-access stratum (e.g., control plane) functions such as mobility, authentication, and bearer management for UEs 115 served by base stations 105 associated with the EPC. User IP packets may be transferred through the S-GW, which itself may be connected to the P-GW. The P-GW may provide IP address allocation as well as other functions. The P-GW may be connected to the network operators IP services. The operators IP services may include access to the Internet, Intranet(s), an IP Multimedia Subsystem (IMS), or a Packet-Switched (PS) Streaming Service.

At least some of the network devices, such as a base station 105, may include subcomponents such as an access network entity, which may be an example of an access node controller (ANC). Each access network entity may communicate with UEs 115 through a number of other access network transmission entities, which may be referred to as a radio head, a smart radio head, or a transmission/reception point (TRP). In some configurations, various functions of each access network entity or base station 105 may be distributed across various network devices (e.g., radio heads and access network controllers) or consolidated into a single network device (e.g., a base station 105).

The communication links 125 between a UE 115 and base station 105 may be or represent an organization of physical resources, such as time and frequency resources. A basic unit of time and frequency may be referred to as a RE. A RE may consist of one symbol period and one subcarrier (e.g., a 15 KHz frequency range). In some wireless communications systems (e.g., LTE systems), a resource block may include 12 consecutive subcarriers in the frequency domain and, for a normal cyclic prefix in each OFDM symbol, 7 consecutive OFDM symbols in the time domain (1 slot), or 84 REs. In other wireless communications systems (e.g., low latency systems), a resource block may include 12 consecutive subcarriers in the frequency domain and one (1) symbol in the time domain, or 12 REs. The number of bits carried by each RE may depend on the modulation scheme (the configuration of symbols that may be selected during each symbol period). Thus, the more resource blocks that a UE receives and the higher the modulation scheme, the higher the data rate may be.

In wireless communications system 100, a transmission time interval (TTI) may be defined as the smallest unit of time in which a base station 105 may schedule a UE 115 for uplink or downlink transmissions. As an example, a base station 105 may allocate one or more TTIs for uplink communication from a UE 115. The base station 105 may then monitor the one or more TTIs to receive uplink signals from the UE 115. In some wireless communications systems (e.g., LTE), a subframe may be the basic unit of scheduling or TTI. In other cases, such as with low latency operation, a different, reduced-duration TTI (e.g., a shortened TTI (sTTI)) may be used. Wireless communications system 100 may employ various TTI durations.

In some cases, an sTTI may contain less symbols than a subframe (e.g., less than 7 symbols), including as few as one, two, or three symbols. The sTTI may include a shared channel (e.g., an sPUSCH), and a UE 115 may use the sPUSCH in accordance with the techniques described herein to send UCI to one or more base stations 105 or other receiving nodes.

FIG. 2 illustrates a table 200 of possible sPUSCH formats that support uplink control information mapping on a shortened uplink shared channel in accordance with various aspects of the present disclosure. In some examples, the sPUSCH formats in table 200 may be implemented by aspects of wireless communication system 100.

A base station 105 may transmit to a UE 115 a grant of uplink transmission resources on a carrier using sTTIs. The granted transmission resources may comprise one or more sPUSCHs, each within an sTTI. As shown in table 200, an sTTI may have an index n—e.g., table 200 illustrates sTTI 0, sTTI 1, sTTI 2, sTTI 3, sTTI 4, and sTTI 5. For each value of n, an sPUSCH within the corresponding sTTI may have one or more possible formats, as illustrated by table 200. The base station 105 may configure the UE 115 to use one of the formats illustrated in table 200 for each sPUSCH granted to the UE 115.

In some cases, as shown in table 200, an sTTI (and thus an sPUSCH scheduled within the sTTI) may comprise either two or three symbols (e.g., two or three OFDM symbols). For example, as an sPUSCH in sTTI 0 or an sPUSCH in sTTI 5 may comprise three symbols while an sPUSCH in sTTI 1, sTTI 2, sTTI 3, or sTTI 4 may comprise two symbols. Each symbol in an sTTI may comprise some number of REs, with each RE corresponding to a different subcarrier within a frequency range spanned by the symbol. For example, each symbol in an sTTI may comprise twelve REs, with each RE corresponding to a different 15 kHz subcarrier. The REs within a single symbol may or may not be contiguous in frequency.

In table 200, an "R" signifies a reference symbol—e.g., a symbol allocated to carrying reference data, such as data corresponding to a reference signal (e.g, DMRS data). In a reference symbol, each RE within the reference symbol may carry reference data.

In table 200, a "D" signifies a data symbol—e.g., a symbol allocated to carrying UCI or scheduled user data. As explained herein, different REs within a data symbol may carry different types of UCI or scheduled user data, and mapping rules may be utilized to map UCI and scheduled user data to the REs within the data symbol of a given sPUSCH.

In table 200, a "|R" signifies that a data symbol (D) in the corresponding sTTI is to be demodulated using reference data in a subsequent sTTI. For example, if sTTI 1 has the format "DD|R," then sTTI 2 may have the format "RD," then an sPUSCH in sTTI 1 may comprise two data symbols, and the two data symbols in sTTI 1 may be demodulated using the reference data included in the reference symbol of sTTI 2.

As shown in table 200, an sPUSCH may in some cases have one data symbol and may in some other cases have two data symbols.

Figure 3A:
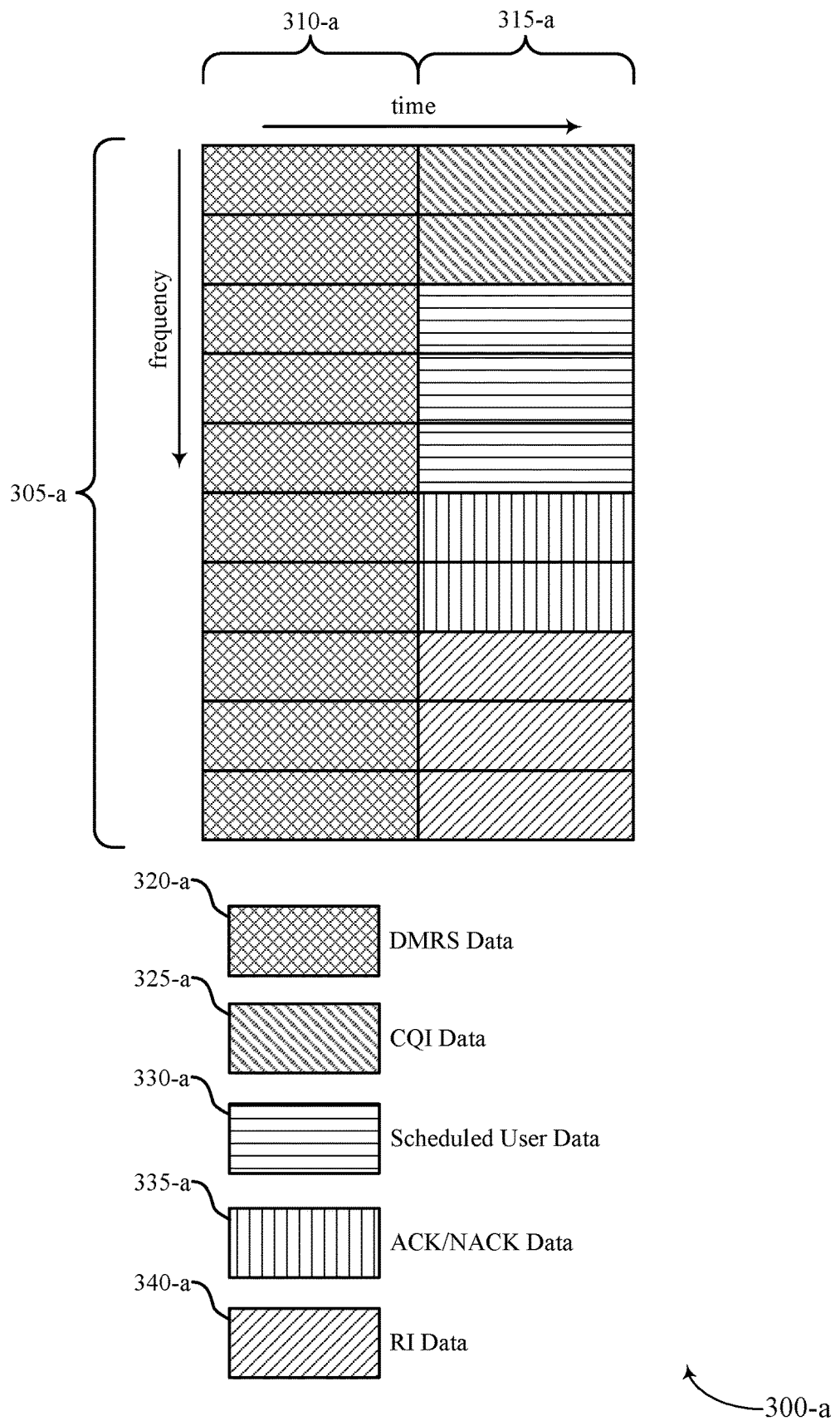
FIGS. 3A through 3D illustrate examples of an uplink control information (UCI) mapping that supports uplink control information mapping on a shortened uplink shared channel in accordance with aspects of the present disclosure.

FIG. 3A illustrates an example of a UCI mapping 300-a for an sPUSCH with one data symbol in accordance with various aspects of the present disclosure. In some examples, UCI mapping 300-a may be implemented by aspects of wireless communication system 100. For example, a UE 115 may configure an sPUSCH in accordance with UCI mapping 300-a, and a base station 105 may receive an sPUSCH configured in accordance with UCI mapping 300-a.

A UE 115 may identify a granted sPUSCH as having one data symbol and may select a mapping rule for sPUSCHs having one data symbol. In some cases, a UCI mapping rule for sPUSCHs with one data symbol may prioritize ACK/NACK data over RI data, RI data over CQI data, and CQI data over scheduled user data. Thus, for example, an amount of ACK/NACK data may be determined according to conventional techniques, and the UE 115 may puncture as many REs within the one data symbol as necessary to accommodate the ACK/NACK data, including REs that would otherwise be allocated to RI or CQI data.

A UCI mapping rule for sPUSCHs with one data symbol may also provide a fixed starting position within the one data symbol for RI data and CQI data, along with a flexible starting position within the one data symbol for ACK/NACK data.

Example UCI mapping 300-a includes sPUSCH 305-a. sPUSCH 305-a includes a reference symbol 310-a and a data symbol 315-a.

The reference symbol 310-a may carry exclusively reference data, such as DMRS data. Thus, as shown in UCI mapping 300-a, a UE 115 may map DMRS data 320-a to each RE within the reference symbol 310-a.

The data symbol 315-a may carry UCI—which may comprise one or more of CQI data 325-a, or ACK/NACK data 335-a, or RI data 340-a—along with scheduled user data 330-a. Thus, the UE 115 may map one or more of CQI data 325-a, or ACK/NACK data 335-a, RI data 340-a, scheduled user data 330-a to each RE within the data symbol 315-a.

In some cases, the fixed starting position for CQI data may be a highest-frequency RE within a data symbol. Thus, the UE 115 may use a rate-matching procedure to map the CQI data 325-a to the highest-frequency RE within the data symbol 315-a as well as to any additional next-highest-frequency REs within the data symbol 315-a necessary to accommodate all the CQI data 325-a. For example, in UCI mapping 300-a, two REs may be sufficient to accommodate all the CQI data 325-a, and the UE 115 may map the CQI data 325-a to the two highest-frequency REs within the data symbol 315-a.

Additionally, or alternatively, in some cases the fixed starting position for RI data may be a lowest-frequency RE within a data symbol. Thus, the UE 115 may use a rate-matching procedure to map the RI data 340-*a* to the lowest-frequency RE within the data symbol 315-*a* as well as to any additional next-lowest-frequency REs within the data symbol 315-*a* necessary to accommodate all the RI data 340-*a*. For example, in UCI mapping 300-*a*, three REs may be sufficient to accommodate all the RI data 340-*a*, and the UE 115 may map the RI data 340-*a* to the three lowest-frequency REs within the data symbol 315-*a*.

In some cases, the flexible starting position for ACK/NACK data may a lowest-frequency RE within a data symbol to which RI data is not mapped (e.g., adjacent to a last RE within a data symbol to which RI data is mapped). For example, the starting position for ACK/NACK data may be a function of the number of REs required for the ACK/NACK data and the total number of REs included in the sPUSCH. In some cases, if the number of REs in a data symbol of an sPUSCH is sufficient to accommodate all RI data and all ACK/NACK data for the sPUSCH, then the starting position for ACK/NACK data may be the lowest-frequency RE not allocated to RI data. If, however, the number of REs in a data symbol of an sPUSCH is insufficient to accommodate all RI data and all ACK/NACK data, then the UE 115 may puncture one or more REs that would otherwise carry RI data and instead map ACK/NACK data to those one or more REs that would otherwise carry RI data. For example, in UCI mapping 300-*a*, two REs may be sufficient to accommodate all the ACK/NACK data 335-*a*, and the UE 115-*a* may map the ACK/NACK data 335-*a* to the two lowest-frequency REs within the data symbol 315-*a* to which RI data 340-*a* was not mapped.

The UE 115 may map scheduled user data to any RE within a data symbol to which neither RI data nor CQI data is mapped, then the UE 115 may puncture scheduled user data as necessary to accommodate any ACK/NACK data. Thus, in the example of UCI mapping 300-*a*, the UE 115 may map the scheduled user data 330-*a* to the five REs within the data symbol 315-*a* to which neither RI data 340-*a* nor CQI data 325-*a* was mapped, then puncture the scheduled user data 330-*a* mapped to two of those five REs in order to accommodate the ACK/NACK data 335-*a*.

Figure 3B:
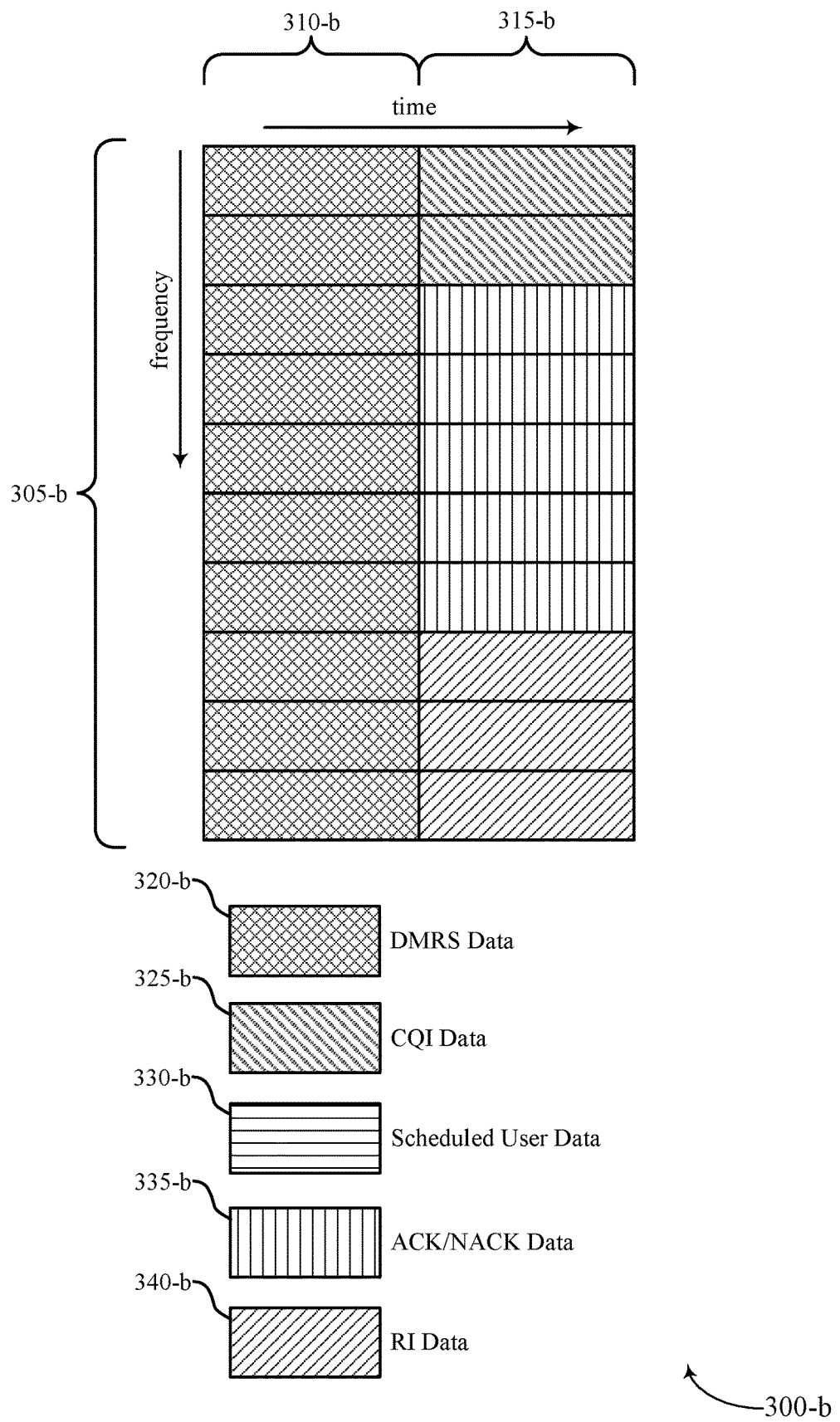

FIG. 3B illustrates an additional example of a UCI mapping 300-*b* for an sPUSCH with one data symbol in accordance with various aspects of the present disclosure. In some examples, UCI mapping 300-*b* may be implemented by aspects of wireless communication system 100. For example, a UE 115 may configure an sPUSCH in accordance with UCI mapping 300-*b*, and a base station 105 may receive an sPUSCH configured in accordance with UCI mapping 300-*b*.

In the example of UCI mapping 300-*b*, five REs may be required to accommodate all the ACK/NACK data 335-*b*. Thus, the UE 115 may not puncture any of CQI data 325-*b* or any of RI data 340-*b* but may puncture all scheduled user data 330-*b* in order to accommodate the ACK/NACK data 335-*b*. Thus, due to the puncturing of all scheduled user data 330-*b*, the data symbol 315-*b* may comprise only UCI (CQI data 325-*b*, ACK/NACK data 335-*b*, and RI data 340-*b*). The starting position for ACK/NACK data may be a function of the number of REs required for the ACK/NACK data and the total number of REs included in the sPUSCH. As in example UCI mapping 300-*a*, the ACK/NACK data 335-*b* in example UCI mapping 300-*b* may begin at the fourth-lowest-frequency RE in the corresponding data symbol 315.

Figure 3C:
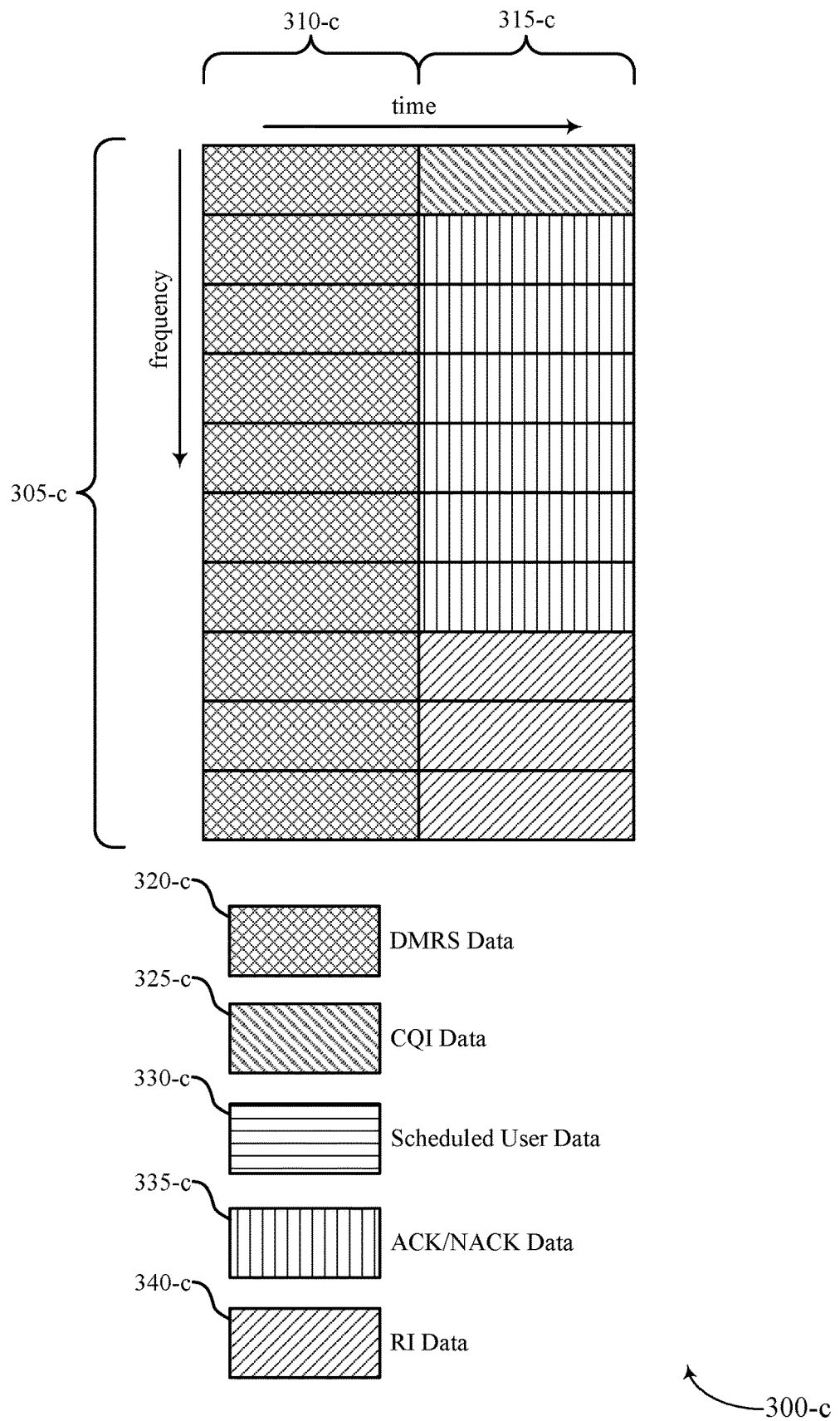

FIG. 3C illustrates an additional example of a UCI mapping 300-*c* for an sPUSCH with one data symbol in accordance with various aspects of the present disclosure. In some examples, UCI mapping 300-*c* may be implemented by aspects of wireless communication system 100. For example, a UE 115 may configure an sPUSCH in accordance with UCI mapping 300-*c*, and a base station 105 may receive an sPUSCH configured in accordance with UCI mapping 300-*c*.

In the example of UCI mapping 300-*c*, six REs may be required to accommodate all the ACK/NACK data 335-*c*. Thus, the UE 115 may puncture all scheduled user data 330-*c* as well as one RE that would otherwise be allocated to CQI data 325-*c* in favor of ACK/NACK data 335-*c*. Beneficially, the UE 115 may map the CQI data 325-*c* that is not punctured in accordance with the corresponding fixed starting position of the highest-frequency RE within the data symbol 315-*c*. The UE 115 may also beneficially map the ACK/NACK data 335-*c* in accordance with the corresponding flexible starting position of the lowest-frequency RE within the data symbol 315-*c* to which the UE 115 does not map RI data 340-*c*.

Figure 3D:
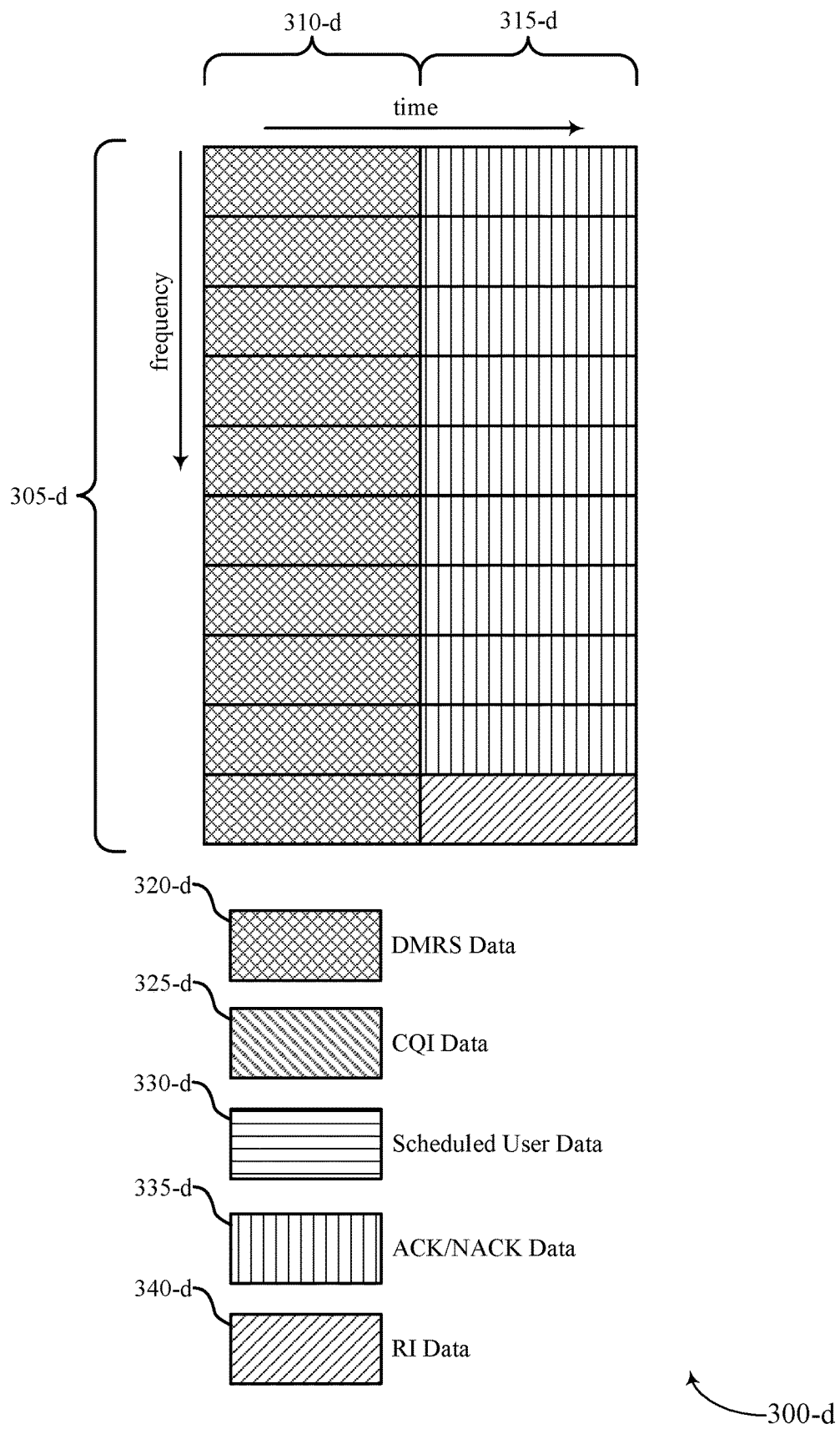

FIG. 3D illustrates an additional example of a UCI mapping 300-*d* for an sPUSCH with one data symbol in accordance with various aspects of the present disclosure. In some examples, UCI mapping 300-*d* may be implemented by aspects of wireless communication system 100. For example, a UE 115 may configure an sPUSCH in accordance with UCI mapping 300-*d*, and a base station 105 may receive an sPUSCH configured in accordance with UCI mapping 300-*d*.

In the example of UCI mapping 300-*d*, nine REs may be required to accommodate all the ACK/NACK data 335-*d*. Thus, the UE 115 may puncture all scheduled user data 330-*d*, all CQI data 325-*a*, as well as two REs that would otherwise be allocated to RI data 340-*d* in favor of ACK/NACK data 335-*d*. Beneficially, the UE 115 may map the RI data 340-*d* that is not punctured in accordance with the corresponding fixed starting position of the lowest-frequency RE within the data symbol 315-*d*. The UE 115 may also beneficially map the ACK/NACK data 335-*d* in accordance with the corresponding flexible starting position of the lowest-frequency RE within the data symbol 315-*d* to which the UE 115 does not map RI data 340-*d*.

One of ordinary skill will understand that any specific RE counts provided herein are solely for the sake of clarity in illustrating the techniques described herein. For example, the techniques described herein may be applied to a reference symbol 310 or data symbol 315 of an sPUSCH having one data symbol that comprises any number of contiguous or non-contiguous REs. Also, as illustrated in table 200, one of ordinary skill will understand that the techniques described herein may be applied to a data symbol 315 that is temporally before or after the reference symbol 310 within an sPUSCH 305-*a* having one data symbol.

Figure 4:
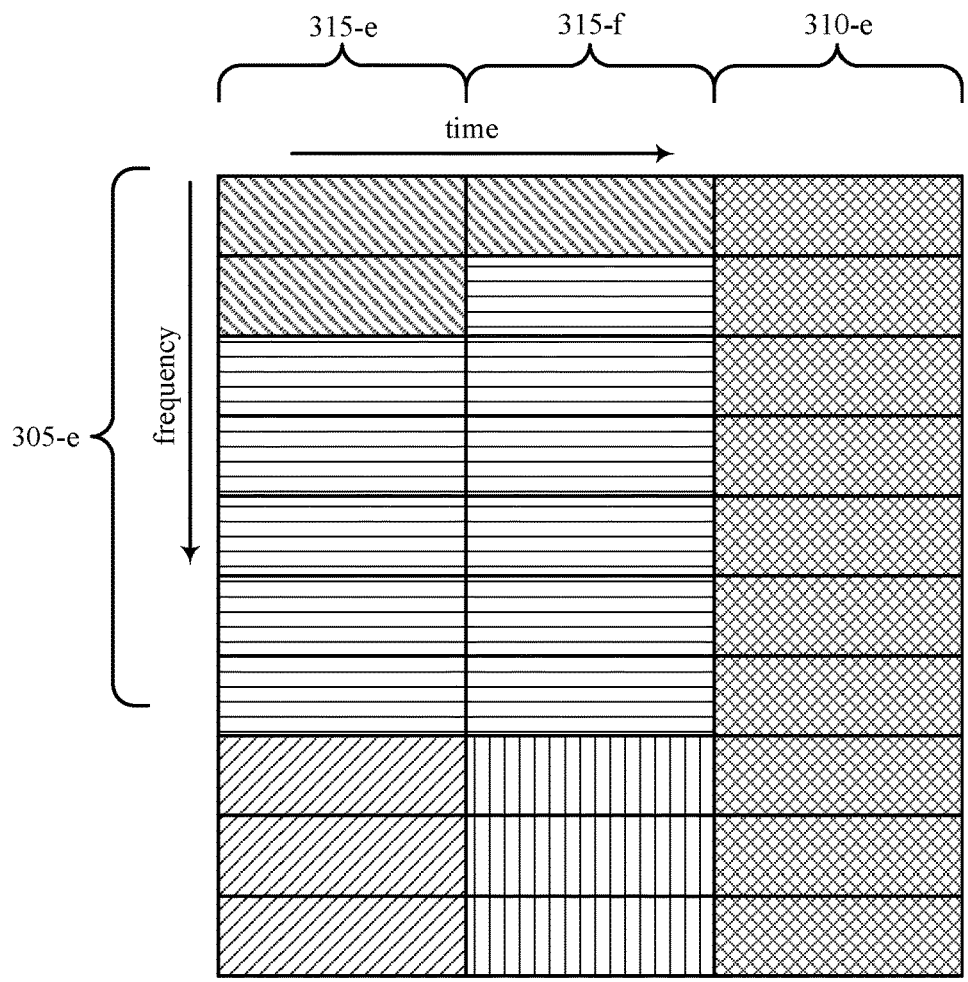
FIG. 4 illustrates an additional example of a UCI mapping that supports uplink control information mapping on a shortened uplink shared channel in accordance with aspects of the present disclosure.
Figure 4:
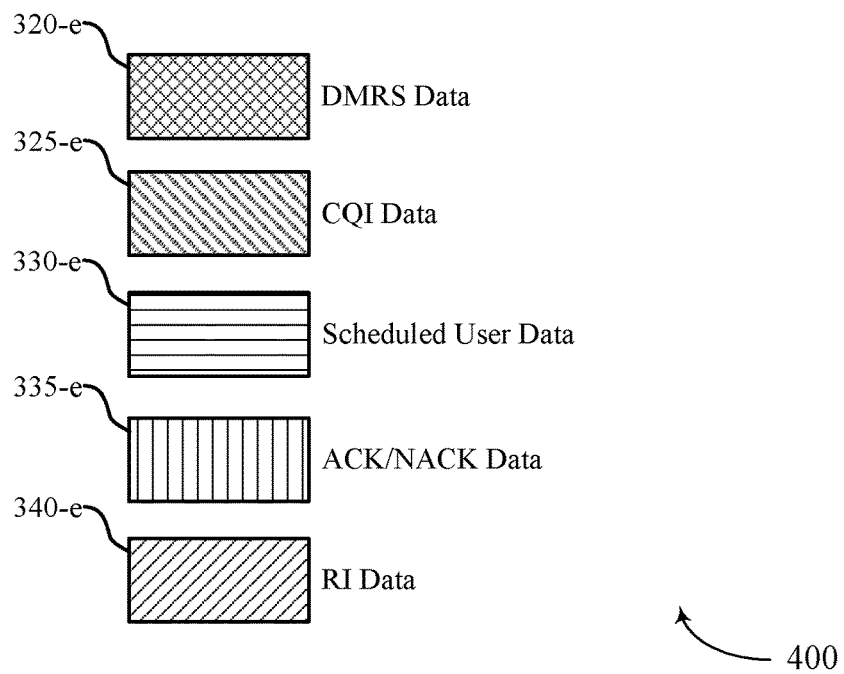

FIG. 4 illustrates an example of a UCI mapping 400 for an sPUSCH with two data symbols in accordance with various aspects of the present disclosure. In some examples, UCI mapping 400 may be implemented by aspects of wireless communication system 100. For example, a UE 115 may configure an sPUSCH in accordance with UCI mapping 400, and a base station 105 may receive an sPUSCH configured in accordance with UCI mapping 400.

A UE 115 may identify a granted sPUSCH as having two data symbols and may select a mapping rule for sPUSCHs having two data symbols. In some cases, a UCI mapping rule for sPUSCHs with two data symbols may map ACK/NACK data to a data symbol that is adjacent in time to a corresponding reference symbol (e.g., a reference symbol comprising reference data, such as DMRS data, that a base station 105 or other receiving node may use to demodulate the ACK/NACK data). For example, an amount of ACK/NACK data may be determined according to conventional techniques, and a UE 115 may map the determined ACK/NACK data to whichever data symbol in an sPUSCH with two data symbols is adjacent to the corresponding reference symbol while mapping RI data to the other data symbol in the sPUSCH. Thus, the data symbol to which a UE 115 maps ACK/NACK data may vary as a function of the location of the corresponding reference symbol. Further, as shown in table 200, the corresponding reference symbol may be within the same sTTI as the ACK/NACK data or within a different sTTI (e.g., when the ACK/NACK data is included in an sTTI having a "|R" format, the corresponding reference symbol may be included in a subsequent sTTI, or when the ACK/NACK data is included in an sTTI having a data symbol as the temporally first symbol, the corresponding reference symbol may be included in a preceding sTTI).

A UCI mapping rule for sPUSCHs with two data symbols may also provide a fixed starting position within a given data symbol for ACK/NACK data, RI data, or CQI data.

Example UCI mapping 400 includes sPUSCH 305-*e*. sPUSCH 305 includes a reference symbol 310-*e*, a first data symbol 315-*e*, and a second data symbol 315-*f*.

The reference symbol 310-*e* may carry exclusively reference data, such as DMRS data. Thus, as shown in UCI mapping 400, a UE 115 may map DMRS data 320-*e* to each RE within the reference symbol 310-*e*. Also, though illustrated in UCI mapping 400 as part of the same sPUSCH 305-*e* as the first data symbol 315-*e* and the second data symbol 315-*f*, the reference symbol 310-*e* may in some cases be part of a different sPUSCH temporally subsequent to sPUSCH 305-*e*. Similarly, though illustrated in UCI mapping 400 as later in time than the first data symbol 315-*e* and the second data symbol 315-*f*, the reference symbol 310-*e* may in some cases be prior in time than the first data symbol 315-*e* and the second data symbol 315-*f*.

In some cases, the fixed starting position for ACK/NACK data within an sPUSCH having two data symbols may be a lowest-frequency RE within the data symbol adjacent to the corresponding reference symbols. The UE 115, in the example of UCI mapping 400, may map the ACK/NACK data 335-*e* to the lowest-frequency RE within the second data symbol 315-*f* as well as to any additional next-lowest-frequency REs within the second data symbol 315-*f* necessary to accommodate all the ACK/NACK data 335-*e*. In the example of UCI mapping 400, three REs are sufficient to accommodate all the ACK/NACK data 335-*e*.

In some cases, the fixed starting position for RI data within an sPUSCH having two data symbols may be a lowest-frequency RE within the data symbol to which the UE 115 does not map ACK/NACK data. Then, in the example of UCI mapping 400, the UE 115 may use a rate-matching procedure to map the RI data 340-*e* to the lowest-frequency RE within the first data symbol 315-*e* as well as to any additional next-lowest-frequency REs within the first data symbol 315-*e* necessary to accommodate all the RI data 340-*e*. In the example of UCI mapping 400, three REs are sufficient to accommodate all the RI data 340-*e*.

In some cases, the fixed starting position for CQI data within an sPUSCH having two data symbols may be a highest-frequency RE and earliest-in-time RE within the two data symbols. Thus, the UE 115 may use a rate-matching procedure to map the CQI data 325-*e* in a time-first, frequency-second manner to as many REs within the first data symbol 315-*e* and the second data symbol 315-*f* as necessary to accommodate all the CQI data 325-*e*. For example, in UCI mapping 300-*e*, three REs may be sufficient to accommodate all the CQI data 325-*e*, and the UE 115 may map the CQI data 325-*e* to the highest-frequency RE within the first data symbol 315-*e*, the highest-frequency RE within the second data symbol 315-*f*, and the second-highest-frequency RE within the first data symbol 315-*e*.

The UE 115 may map scheduled user data to any RE within a data symbol to which UCI (e.g., ACK/NACK data, RI data, and CQI data) is not mapped. Thus, the UE 115 may map the scheduled user data 330-*e* to the eleven REs within the first data symbol 315-*e* and second data symbol 315-*f* to which the ACK/NACK data 335-*e*, RI data 340-*e*, and CQI data 325-*e* was not mapped.

In the example of UCI mapping 300-*e*, puncturing of CQI data 325-*e* or RI data 340-*e* is not necessary, and the UE 115 may puncture only a portion of the scheduled user data 330-*e* in order to accommodate the ACK/NACK data 335-*e*. If the number of REs within the two data symbols of an sPUSCH having two data symbols is insufficient to accommodate all UCI, puncturing may proceed in accordance with a prioritization of ACK/NACK data over RI data, RI data over CQI data, and CQI data over scheduled user data.

One of ordinary skill will understand that any specific RE counts provided herein are solely for the sake of clarity in illustrating the techniques described herein. For example, the techniques described herein may be applied to a reference symbol 310 or data symbols 315 of an sPUSCH having two data symbols each comprising any number of contiguous or non-contiguous REs. Also, as illustrated in table 200, one of ordinary skill will understand that the techniques described herein may be applied to two data symbols 315 that are temporally before or after the corresponding reference symbol 310.

Figure 5:
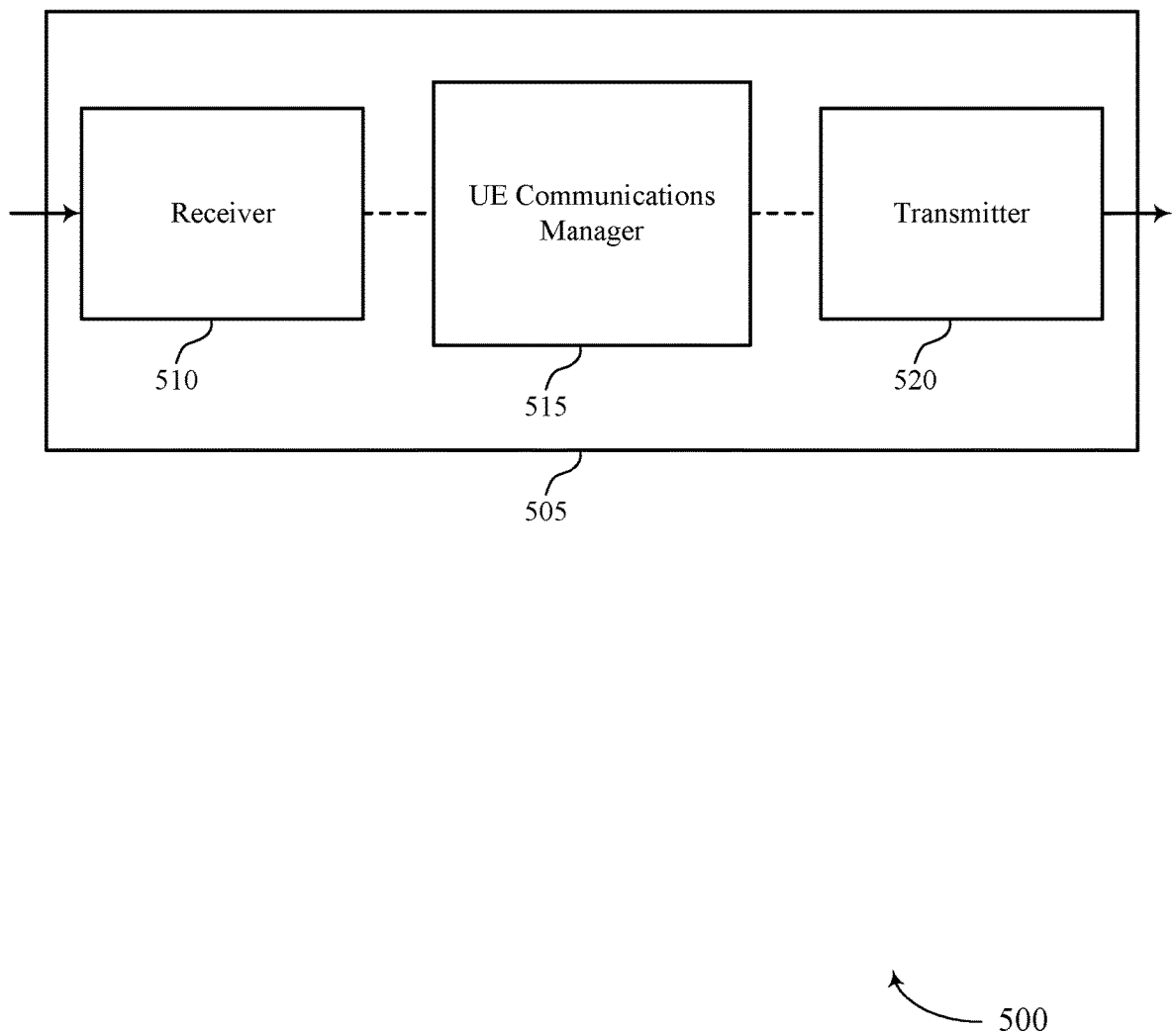
FIGS. 5 through 7 show block diagrams of a device that supports uplink control information mapping on a shortened uplink shared channel in accordance with aspects of the present disclosure.

FIG. 5 shows a block diagram 500 of a wireless device 505 that supports UCI mapping on a shortened uplink shared channel in accordance with aspects of the present disclosure. Wireless device 505 may be an example of aspects of a UE 115 as described herein. Wireless device 505 may include receiver 510, UE communications manager 515, and transmitter 520. Wireless device 505 may also include a processor. Each of these components may be in communication with one another (e.g., via one or more buses).

Receiver 510 may receive information such as packets, user data, or control information associated with various information channels (e.g., control channels, data channels, and information related to UCI mapping on a shortened uplink shared channel). Information may be passed on to other components of the device. The receiver 510 may be an example of aspects of the transceiver 835 described with reference to FIG. 8. The receiver 510 may utilize a single antenna or a set of antennas.

UE communications manager 515 may be an example of aspects of the UE communications manager 815 described with reference to FIG. 8.

UE communications manager 515 and/or at least some of its various sub-components may be implemented in hardware, software executed by a processor, firmware, or any combination thereof. If implemented in software executed by a processor, the functions of the UE communications manager 515 and/or at least some of its various sub-components may be executed by a general-purpose processor, a digital signal processor (DSP), an application-specific integrated circuit (ASIC), an field-programmable gate array (FPGA) or other programmable logic device, discrete gate or transistor logic, discrete hardware components, or any combination thereof designed to perform the functions described in the present disclosure. The UE communications manager 515 and/or at least some of its various sub-components may be physically located at various positions, including being distributed such that portions of functions are implemented at different physical locations by one or more physical devices. In some examples, UE communications manager 515 and/or at least some of its various sub-components may be a separate and distinct component in accordance with various aspects of the present disclosure. In other examples, UE communications manager 515 and/or at least some of its various sub-components may be combined with one or more other hardware components, including but not limited to an I/O component, a transceiver, a network server, another computing device, one or more other components described in the present disclosure, or a combination thereof in accordance with various aspects of the present disclosure.

UE communications manager 515 may identify a number of data symbols included in an sPUSCH, select a mapping rule for the sPUSCH based on the identified number of data symbols, map UCI to REs within the sPUSCH according to the selected mapping rule, and transmit the UCI via the sPUSCH.

Transmitter 520 may transmit signals generated by other components of the device. In some examples, the transmitter 520 may be collocated with a receiver 510 in a transceiver module. For example, the transmitter 520 may be an example of aspects of the transceiver 835 described with reference to FIG. 8. The transmitter 520 may utilize a single antenna or a set of antennas.

Figure 6:
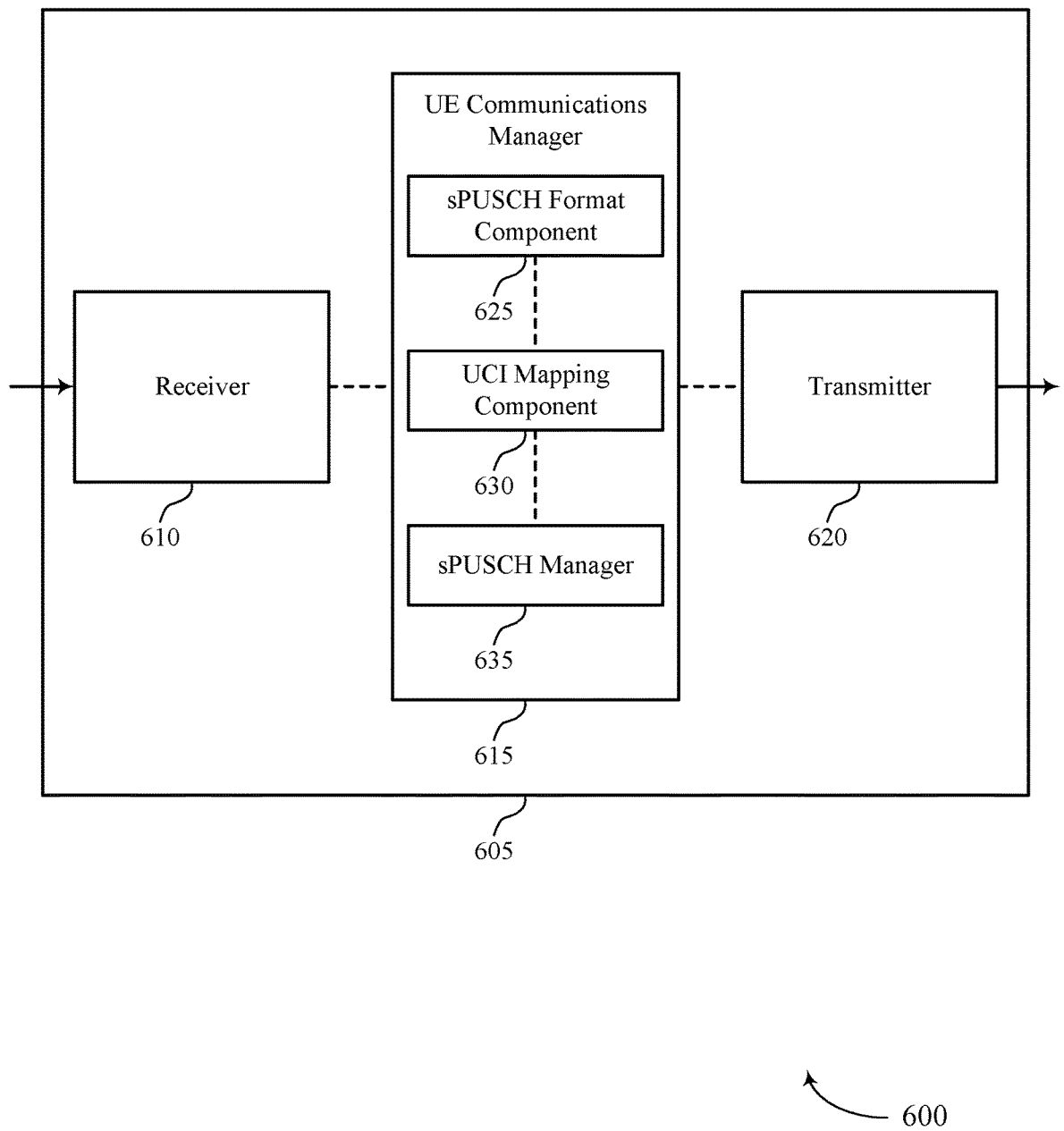

FIG. 6 shows a block diagram 600 of a wireless device 605 that supports UCI mapping on a shortened uplink shared channel in accordance with aspects of the present disclosure. Wireless device 605 may be an example of aspects of a wireless device 505 or a UE 115 as described with reference to FIG. 5. Wireless device 605 may include receiver 610, UE communications manager 615, and transmitter 620. Wireless device 605 may also include a processor. Each of these components may be in communication with one another (e.g., via one or more buses).

Receiver 610 may receive information such as packets, user data, or control information associated with various information channels (e.g., control channels, data channels, and information related to UCI mapping on a shortened uplink shared channel). Information may be passed on to other components of the device. The receiver 610 may be an example of aspects of the transceiver 835 described with reference to FIG. 8. The receiver 610 may utilize a single antenna or a set of antennas.

UE communications manager 615 may be an example of aspects of the UE communications manager 815 described with reference to FIG. 8. UE communications manager 615 may also include sPUSCH format component 625, UCI mapping component 630, and sPUSCH manager 635.

sPUSCH format component 625 may identify a number of data symbols included in an sPUSCH.

UCI mapping component 630 may select a mapping rule for the sPUSCH based on the identified number of data symbols and map UCI to REs within the sPUSCH according to the selected mapping rule. In some cases, the identified number of data symbols is one. In some cases, the identified number of data symbols is two. In some cases, the reference symbol is within a same sTTI as the first data symbol of the sPUSCH. In some cases, the first data symbol of the sPUSCH is within a first sTTI and the reference symbol is within a second sTTI that is different from (e.g., prior to or subsequent to) the first sTTI.

sPUSCH manager 635 may transmit the UCI via the sPUSCH.

Transmitter 620 may transmit signals generated by other components of the device. In some examples, the transmitter 620 may be collocated with a receiver 610 in a transceiver module. For example, the transmitter 620 may be an example of aspects of the transceiver 835 described with reference to FIG. 8. The transmitter 620 may utilize a single antenna or a set of antennas.

Figure 7:
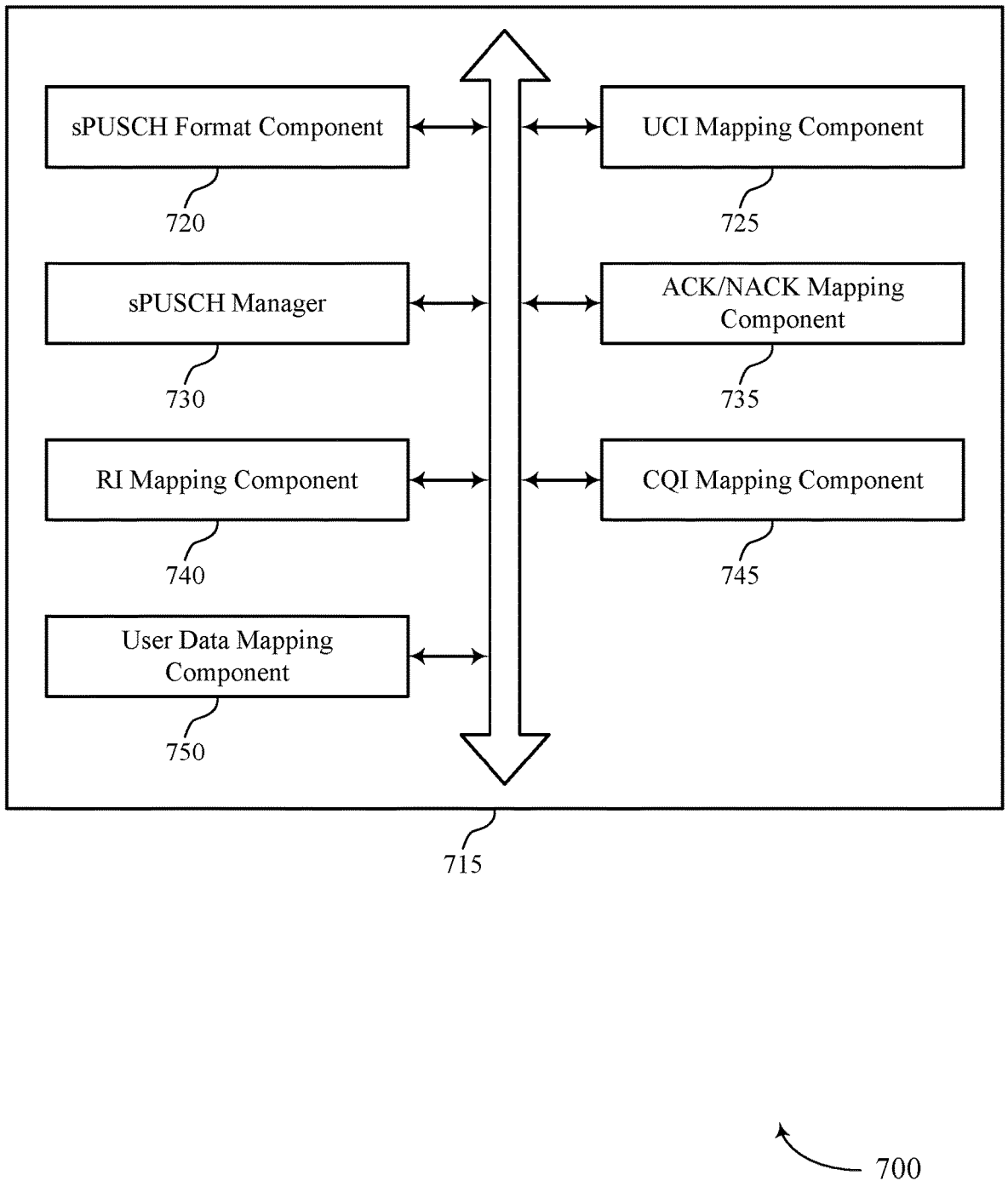

FIG. 7 shows a block diagram 700 of a UE communications manager 715 that supports UCI mapping on a shortened uplink shared channel in accordance with aspects of the present disclosure. The UE communications manager 715 may be an example of aspects of a UE communications manager 515, a UE communications manager 615, or a UE communications manager 815 described with reference to FIGS. 5, 6, and 8. The UE communications manager 715 may include sPUSCH format component 720, UCI mapping component 725, sPUSCH manager 730, ACK/NACK mapping component 735, RI mapping component 740, CQI mapping component 745, and user data mapping component 750. Each of these modules may communicate, directly or indirectly, with one another (e.g., via one or more buses).

sPUSCH format component 720 may identify a number of data symbols included in an sPUSCH.

UCI mapping component 725 may select a mapping rule for the sPUSCH based on the identified number of data symbols and map UCI to REs within the sPUSCH according to the selected mapping rule. In some cases, the identified number of data symbols is one. In some cases, the identified number of data symbols is two. In some cases, the reference symbol is within a same sTTI as the first data symbol of the sPUSCH. In some cases, the first data symbol of the sPUSCH is within a first sTTI and the reference symbol is within a second sTTI that is different from (e.g., prior to or subsequent to) the first sTTI.

sPUSCH manager 730 may transmit the UCI via the sPUSCH.

ACK/NACK mapping component 735 may map ACK/NACK data included within the UCI in accordance with a first priority level.

In some cases, where the identified number of data symbols is one, ACK/NACK mapping component 735 may determine that a number of REs included in a data symbol of the sPUSCH is insufficient to carry all the RI data included within the UCI and all the ACK/NACK data included within the UCI and may puncture at least a portion of the RI data included within the UCI in favor of at least a portion of the ACK/NACK data included within the UCI.

In some cases, where the identified number of data symbols is one, ACK/NACK mapping component 735 may determine that a number of REs included in a data symbol of the sPUSCH is sufficient to carry all the RI data included within the UCI and all the ACK/NACK data included within the UCI and may map the ACK/NACK data included within the UCI to one or more REs including a third starting position, the third starting position adjacent in frequency to a last RE allocated to RI data.

In some cases, where the identified number of data symbols is one, ACK/NACK mapping component 735 may determine that a number of REs included in a data symbol of the sPUSCH is sufficient to carry all the RI data included within the UCI and all the ACK/NACK data included within the UCI, may determine that the number of REs included in the data symbol of the sPUSCH is insufficient to carry all the RI data included within the UCI, all the ACK/NACK data included within the UCI, and all CQI data included within the UCI, and may puncture at least a portion of the CQI data included within the UCI in favor of at least a portion of the ACK/NACK data included within the UCI.

In some cases, where the identified number of data symbols is two, ACK/NACK mapping component 735 may map acknowledgement (ACK/NACK) data included within the UCI to a first data symbol of the sPUSCH, the first data symbol of the sPUSCH selected to necessarily be adjacent in time to a reference symbol allocated to reference data for decoding the sPUSCH. ACK/NACK mapping component 735 may in some such cases map the ACK/NACK data included within the UCI to one or more REs including a lowest-frequency RE within the first data symbol. In some cases, the reference data includes DMRS data. ACK/NACK mapping component 735 may map the ACK/NACK data included within the UCI in accordance with a puncturing procedure.

RI mapping component 740 may map RI data included within the UCI in accordance with a second priority level that is lower than the first priority level. In some cases, where the identified number of data symbols is one, RI mapping component 740 may map RI data included within the UCI to one or more REs including a second fixed starting position; in some cases, the second fixed starting position is a lowest-frequency RE within a data symbol of the sPUSCH. In some cases, where the identified number of data symbols is two, RI mapping component 740 may map RI data included within the UCI to a second data symbol of the sPUSCH, and may map the RI data included within the UCI to one or more REs including a lowest-frequency RE within the second data symbol. RI mapping component 740 may map the RI included within the UCI in accordance with a rate-matching procedure.

CQI mapping component 745 may map CQI data included within the UCI in accordance with a third priority level that is lower than the second priority level. In some cases, where the identified number of data symbols is one, CQI mapping component 745 may map CQI data included within the UCI to one or more REs including a first fixed starting position; in some cases, the first fixed starting position is a highest-frequency RE within a data symbol of the sPUSCH. In some cases, where the identified number of data symbols is two, CQI mapping component 745 may map CQI data included within the UCI in a time-first, frequency-second manner to one or more REs including a highest-frequency RE within the first data symbol, within the second data symbol, or within both the first data symbol and the second data symbol. CQI mapping component 745 may map the CQI data included within the UCI in accordance with a rate-matching procedure.

User data mapping component 750 may map user data scheduled for the sPUSCH in accordance with a fourth priority level that is lower than the third priority level. In some cases, user data mapping component 750 may determine that a number of REs included in one or more data symbols of the sPUSCH is sufficient to carry all the RI data included within the UCI, all the ACK/NACK data included within the UCI, and all CQI data included within the UCI, and may map user data scheduled for the sPUSCH to one or more REs included in the data symbol of the sPUSCH.

Figure 8:
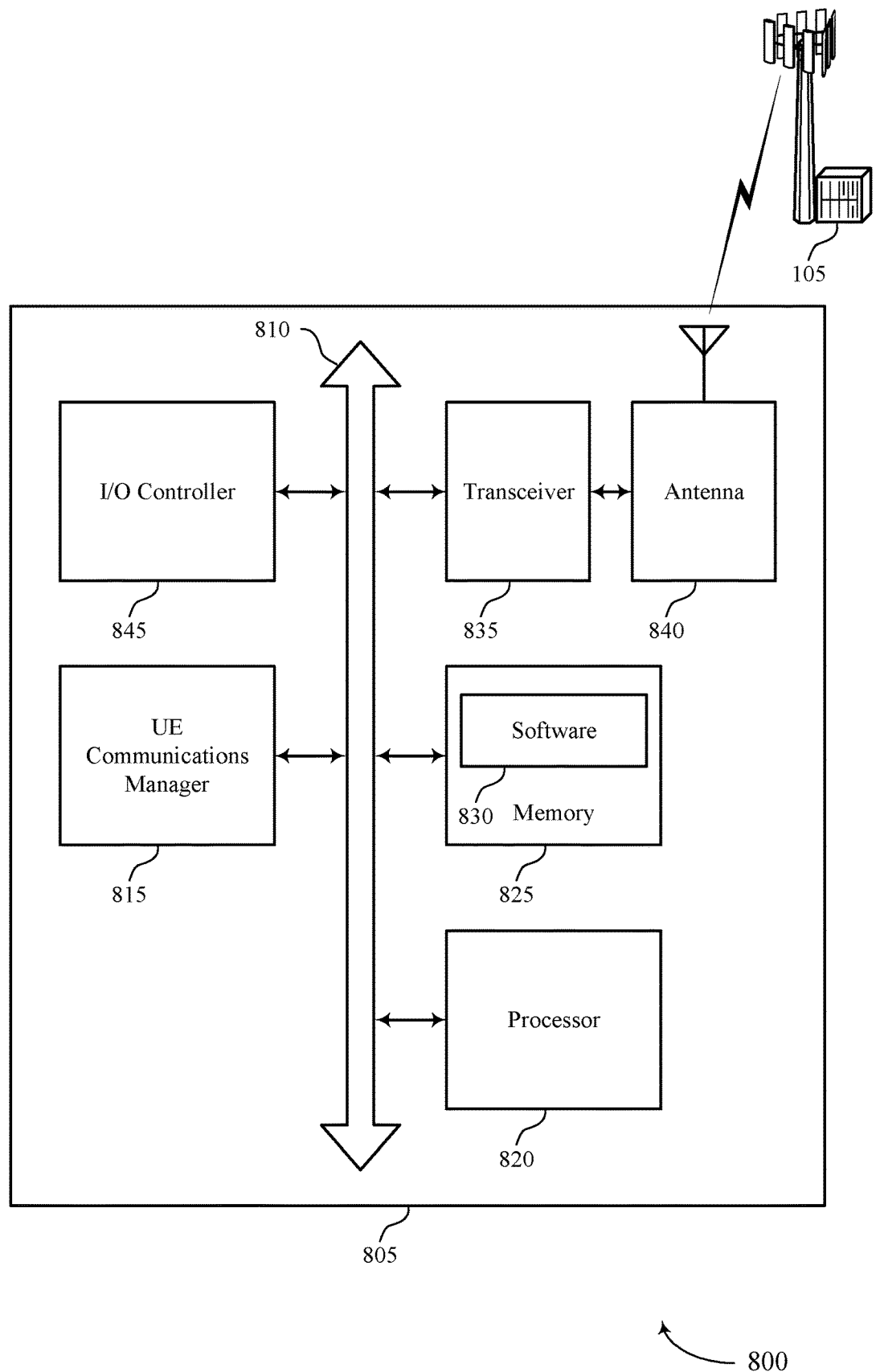
FIG. 8 illustrates a block diagram of a system including a user equipment (UE) that supports uplink control information mapping on a shortened uplink shared channel in accordance with aspects of the present disclosure.

FIG. 8 shows a diagram of a system 800 including a device 805 that supports UCI mapping on a shortened uplink shared channel in accordance with aspects of the present disclosure. Device 805 may be an example of or include the components of wireless device 505, wireless device 605, or a UE 115 as described above, e.g., with reference to FIGS. 5 and 6. Device 805 may include components for bi-directional voice and data communications including components for transmitting and receiving communications, including UE communications manager 815, processor 820, memory 825, software 830, transceiver 835, antenna 840, and I/O controller 845. These components may be in electronic communication via one or more buses (e.g., bus 810). Device 805 may communicate wirelessly with one or more base stations 105.

Processor 820 may include an intelligent hardware device, (e.g., a general-purpose processor, a DSP, a central processing unit (CPU), a microcontroller, an ASIC, an FPGA, a programmable logic device, a discrete gate or transistor logic component, a discrete hardware component, or any combination thereof). In some cases, processor 820 may be configured to operate a memory array using a memory controller. In other cases, a memory controller may be integrated into processor 820. Processor 820 may be configured to execute computer-readable instructions stored in a memory to perform various functions (e.g., functions or tasks supporting UCI mapping on a shortened uplink shared channel).

Memory 825 may include random access memory (RAM) and read only memory (ROM). The memory 825 may store computer-readable, computer-executable software 830 including instructions that, when executed, cause the processor to perform various functions described herein. In some cases, the memory 825 may contain, among other things, a basic input/output system (BIOS) which may control basic hardware or software operation such as the interaction with peripheral components or devices.

Software 830 may include code to implement aspects of the present disclosure, including code to support UCI mapping on a shortened uplink shared channel. Software 830 may be stored in a non-transitory computer-readable medium such as system memory or other memory. In some cases, the software 830 may not be directly executable by the processor but may cause a computer (e.g., when compiled and executed) to perform functions described herein.

Transceiver 835 may communicate bi-directionally, via one or more antennas, wired, or wireless links as described above. For example, the transceiver 835 may represent a wireless transceiver and may communicate bi-directionally with another wireless transceiver. The transceiver 835 may also include a modem to modulate the packets and provide the modulated packets to the antennas for transmission, and to demodulate packets received from the antennas.

In some cases, the wireless device may include a single antenna 840. However, in some cases the device may have more than one antenna 840, which may be capable of concurrently transmitting or receiving multiple wireless transmissions.

I/O controller 845 may manage input and output signals for device 805. I/O controller 845 may also manage peripherals not integrated into device 805. In some cases, I/O controller 845 may represent a physical connection or port to an external peripheral. In some cases, I/O controller 845 may utilize an operating system such as iOS®, ANDROID®, MS-DOS®, MS-WINDOWS®, OS/2®, UNIX®, LINUX®, or another known operating system. In other cases, I/O controller 845 may represent or interact with a modem, a keyboard, a mouse, a touchscreen, or a similar device. In some cases, I/O controller 845 may be implemented as part of a processor. In some cases, a user may interact with device 805 via I/O controller 845 or via hardware components controlled by I/O controller 845.

Figure 9:
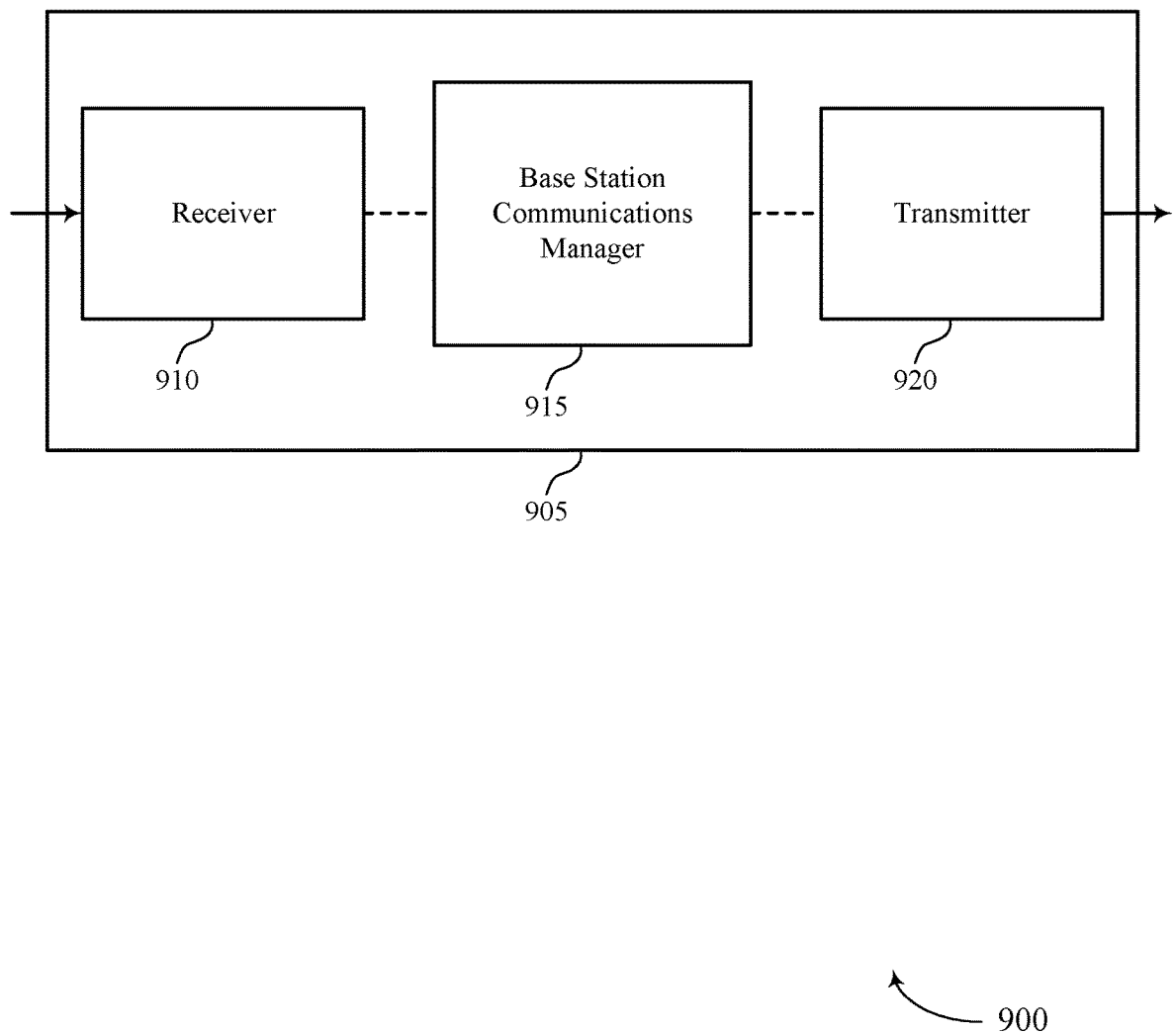
FIGS. 9 through 11 show block diagrams of a device that supports uplink control information mapping on a shortened uplink shared channel in accordance with aspects of the present disclosure.

FIG. 9 shows a block diagram 900 of a wireless device 905 that supports UCI mapping on a shortened uplink shared channel in accordance with aspects of the present disclosure. Wireless device 905 may be an example of aspects of a base station 105 as described herein. Wireless device 905 may include receiver 910, base station communications manager 915, and transmitter 920. Wireless device 905 may also include a processor. Each of these components may be in communication with one another (e.g., via one or more buses).

Receiver 910 may receive information such as packets, user data, or control information associated with various information channels (e.g., control channels, data channels, and information related to UCI mapping on a shortened uplink shared channel, etc.). Information may be passed on to other components of the device. The receiver 910 may be an example of aspects of the transceiver 1235 described with reference to FIG. 12. The receiver 910 may utilize a single antenna or a set of antennas.

Base station communications manager 915 may be an example of aspects of the base station communications manager 1215 described with reference to FIG. 12.

Base station communications manager 915 and/or at least some of its various sub-components may be implemented in hardware, software executed by a processor, firmware, or any combination thereof. If implemented in software executed by a processor, the functions of the base station communications manager 915 and/or at least some of its various sub-components may be executed by a general-purpose processor, a DSP, an ASIC, an FPGA or other programmable logic device, discrete gate or transistor logic, discrete hardware components, or any combination thereof designed to perform the functions described in the present disclosure. The base station communications manager 915 and/or at least some of its various sub-components may be physically located at various positions, including being distributed such that portions of functions are implemented at different physical locations by one or more physical devices. In some examples, base station communications manager 915 and/or at least some of its various sub-components may be a separate and distinct component in accordance with various aspects of the present disclosure. In other examples, base station communications manager 915 and/or at least some of its various sub-components may be combined with one or more other hardware components, including but not limited to an I/O component, a transceiver, a network server, another computing device, one or more other components described in the present disclosure, or a combination thereof in accordance with various aspects of the present disclosure.

Base station communications manager 915 may determine a number of data symbols included in an sPUSCH, identify a mapping rule for the sPUSCH based on the determined number of data symbols, determine, based on the identified mapping rule, one or more REs within the sPUSCH to monitor for UCI, and monitor the one or more REs for the UCI.

Transmitter 920 may transmit signals generated by other components of the device. In some examples, the transmitter 920 may be collocated with a receiver 910 in a transceiver module. For example, the transmitter 920 may be an example of aspects of the transceiver 1235 described with reference to FIG. 12. The transmitter 920 may utilize a single antenna or a set of antennas.

Figure 10:
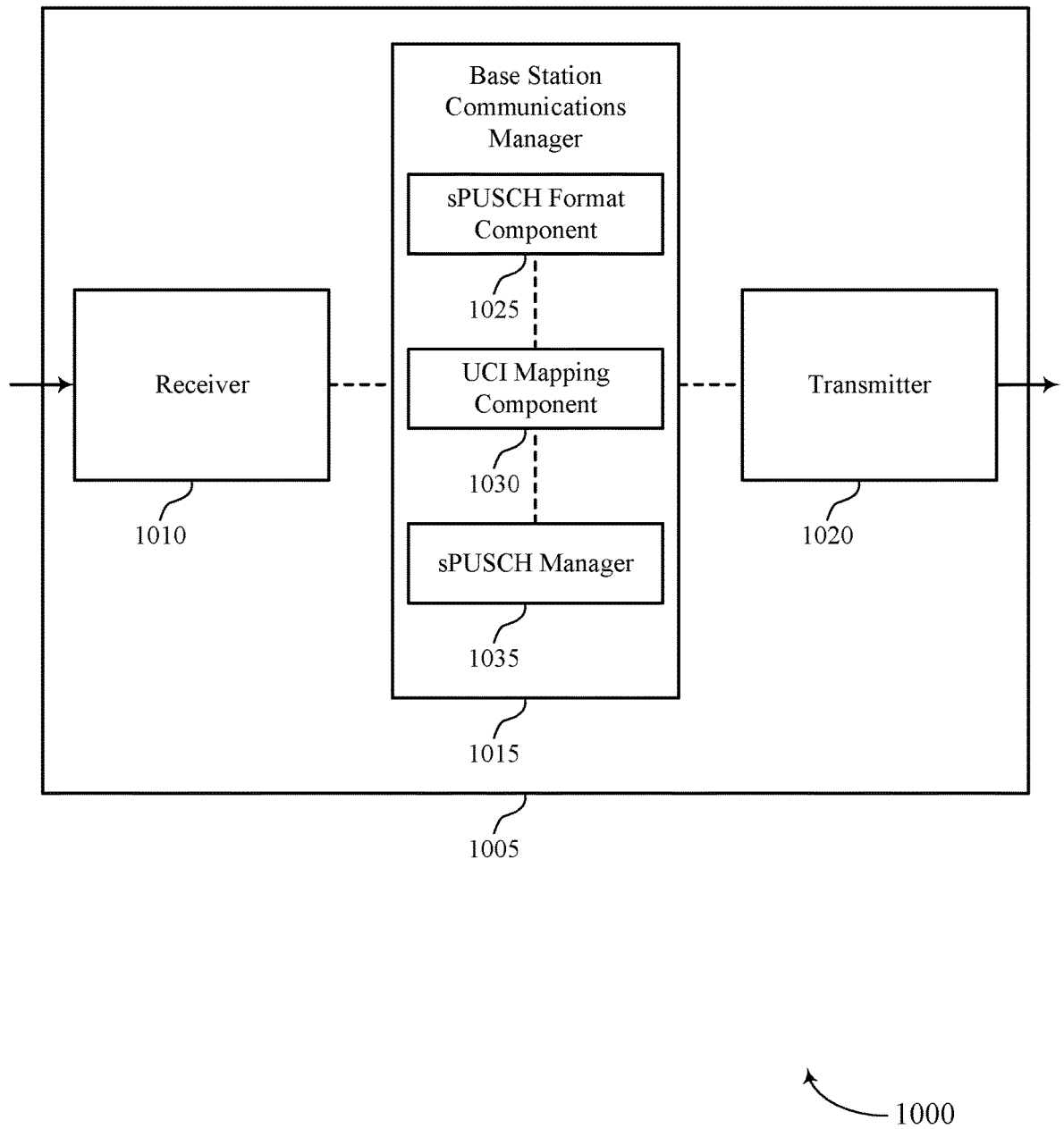

FIG. 10 shows a block diagram 1000 of a wireless device 1005 that supports UCI mapping on a shortened uplink shared channel in accordance with aspects of the present disclosure. Wireless device 1005 may be an example of aspects of a wireless device 905 or a base station 105 as described with reference to FIG. 9. Wireless device 1005 may include receiver 1010, base station communications manager 1015, and transmitter 1020. Wireless device 1005 may also include a processor. Each of these components may be in communication with one another (e.g., via one or more buses).

Receiver 1010 may receive information such as packets, user data, or control information associated with various information channels (e.g., control channels, data channels, and information related to UCI mapping on a shortened uplink shared channel). Information may be passed on to other components of the device. The receiver 1010 may be an example of aspects of the transceiver 1235 described with reference to FIG. 12. The receiver 1010 may utilize a single antenna or a set of antennas.

Base station communications manager 1015 may be an example of aspects of the base station communications manager 1215 described with reference to FIG. 12. Base station communications manager 1015 may also include sPUSCH format component 1025, UCI mapping component 1030, and sPUSCH manager 1035.

sPUSCH format component 1025 may determine a number of data symbols included in an sPUSCH.

UCI mapping component 1030 may identify a mapping rule for the sPUSCH based on the determined number of data symbols and determine, based on the identified mapping rule, one or more REs within the sPUSCH to monitor for UCI. In some cases, the determined number of data symbols is one. In some cases, the determined number of data symbols is two. In some cases, where the determined number of data symbols is two, determining, based on the identified mapping rule, one or more REs within the sPUSCH to monitor for UCI includes determining a reference symbol allocated to reference data for decoding the sPUSCH. In some cases, the reference symbol is within a same sTTI as the first data symbol of the sPUSCH. In some cases, the first data symbol of the sPUSCH is within a first sTTI and the reference symbol is within a second sTTI that is different from (e.g., prior to or subsequent to) the first sTTI. In some cases, the reference data includes DMRS data.

sPUSCH manager 1035 may monitor the one or more REs for the UCI.

Transmitter 1020 may transmit signals generated by other components of the device. In some examples, the transmitter 1020 may be collocated with a receiver 1010 in a transceiver module. For example, the transmitter 1020 may be an example of aspects of the transceiver 1235 described with reference to FIG. 12. The transmitter 1020 may utilize a single antenna or a set of antennas.

Figure 11:
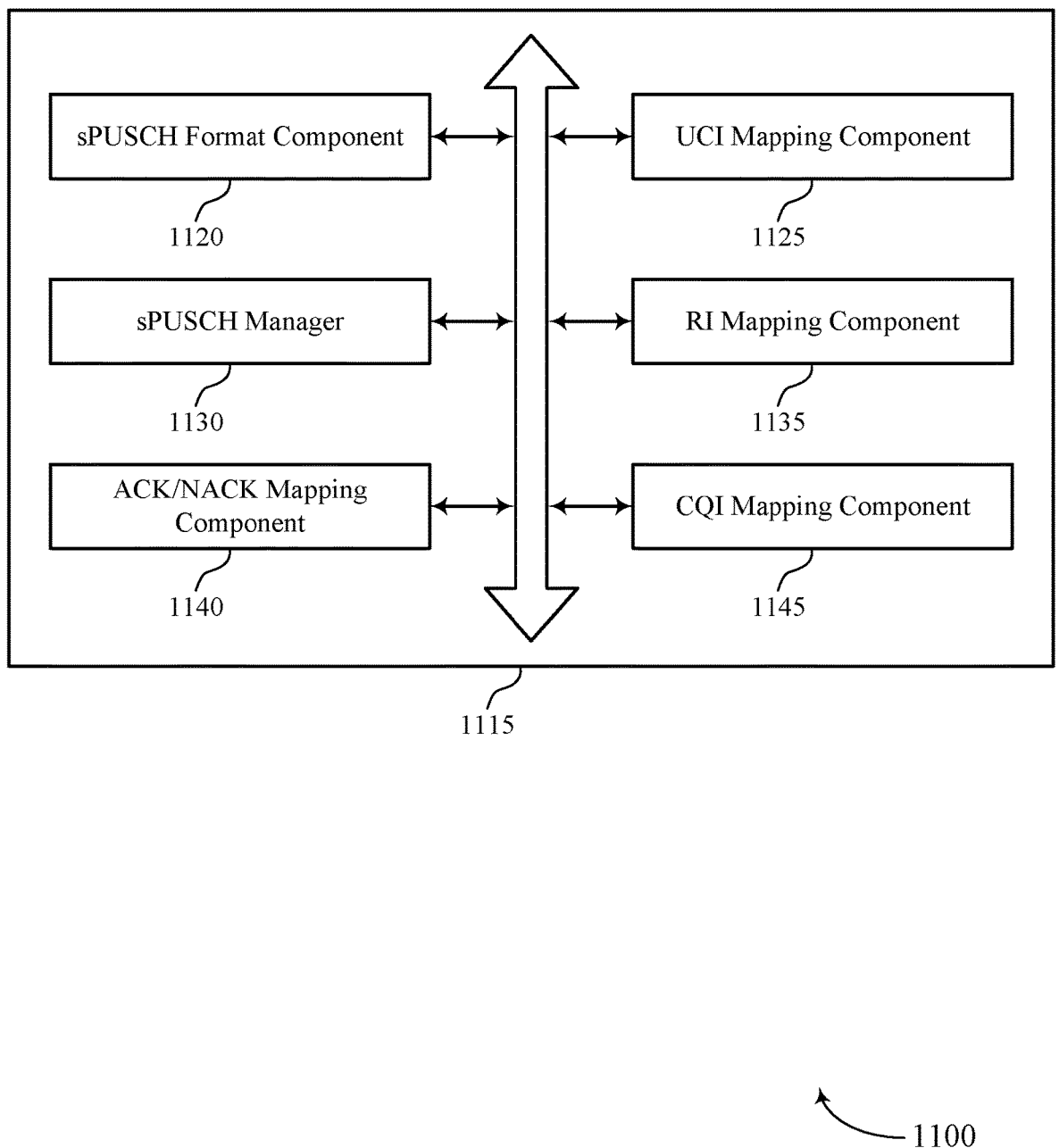

FIG. 11 shows a block diagram 1100 of a base station communications manager 1115 that supports UCI mapping on a shortened uplink shared channel in accordance with aspects of the present disclosure. The base station communications manager 1115 may be an example of aspects of a base station communications manager 1215 described with reference to FIGS. 9, 10, and 12. The base station communications manager 1115 may include sPUSCH format component 1120, UCI mapping component 1125, sPUSCH manager 1130, RI mapping component 1135, ACK/NACK mapping component 1140, and CQI mapping component 1145. Each of these modules may communicate, directly or indirectly, with one another (e.g., via one or more buses).

sPUSCH format component 1120 may determine a number of data symbols included in an sPUSCH.

UCI mapping component 1125 may identify a mapping rule for the sPUSCH based on the determined number of data symbols and determine, based on the identified mapping rule, one or more REs within the sPUSCH to monitor for UCI. In some cases, the determined number of data symbols is one. In some cases, the determined number of data symbols is two. In some cases, where the determined number of data symbols is two, determining, based on the identified mapping rule, one or more REs within the sPUSCH to monitor for UCI includes determining a reference symbol allocated to reference data for decoding the sPUSCH. In some cases, the reference symbol is within a same sTTI as the first data symbol of the sPUSCH. In some cases, the first data symbol of the sPUSCH is within a first sTTI and the reference symbol is within a second sTTI that is different from (e.g., prior to or subsequent to) the first sTTI. In some cases, the reference data includes DMRS data.

sPUSCH manager 1130 may monitor the one or more REs for the UCI.

In some cases, where the determined number of data symbols is one, RI mapping component 1135 may determine one or more REs including a fixed starting position within a data symbol of the sPUSCH to monitor for RI data; in some cases, the fixed starting position is a lowest-frequency RE within the data symbol of the sPUSCH. In some cases, where the determined number of data symbols is two, RI mapping component 1135 may determine a second data symbol of the sPUSCH to monitor for rank indication (RI) data and may determine one or more REs including a lowest-frequency RE within the second data symbol to monitor for the RI data.

In some cases, where the determined number of data symbols is one, ACK/NACK mapping component 1140 may determine that an RE corresponding to the fixed starting position includes RI data, identify a second RE within the data symbol of the sPUSCH that is nearest in frequency to the fixed starting position and that lacks RI data, and monitor the second RE for ACK/NACK data. In some cases, where the determined number of data symbols is one, ACK/NACK mapping component 1140 may determine that a RE corresponding to the fixed starting position lacks RI data and may determine whether the RE corresponding to the fixed starting position includes ACK/NACK data. In some cases, where the determined number of data symbols is two, ACK/NACK mapping component 1140 may determine a first data symbol of the sPUSCH, the first data symbol of the sPUSCH adjacent in time to the reference symbol, to monitor for acknowledgement (ACK/NACK) data, and may determine one or more REs including a lowest-frequency RE within the first data symbol to monitor for the ACK/NACK data.

In some cases, where the determined number of data symbols is one, CQI mapping component 1145 may determine one or more REs including a second fixed starting position within the data symbol of the sPUSCH to monitor for CQI data; in some cases, the second fixed starting position is a highest-frequency RE within the data symbol of the sPUSCH. In some cases, where the determined number of data symbols is two, CQI mapping component 1145 may determine in a time-first, frequency-second manner one or more REs including a highest-frequency RE within first data symbol, within the second data symbol, or within both the first data symbol and the second data symbol to monitor for CQI data.

Figure 12:
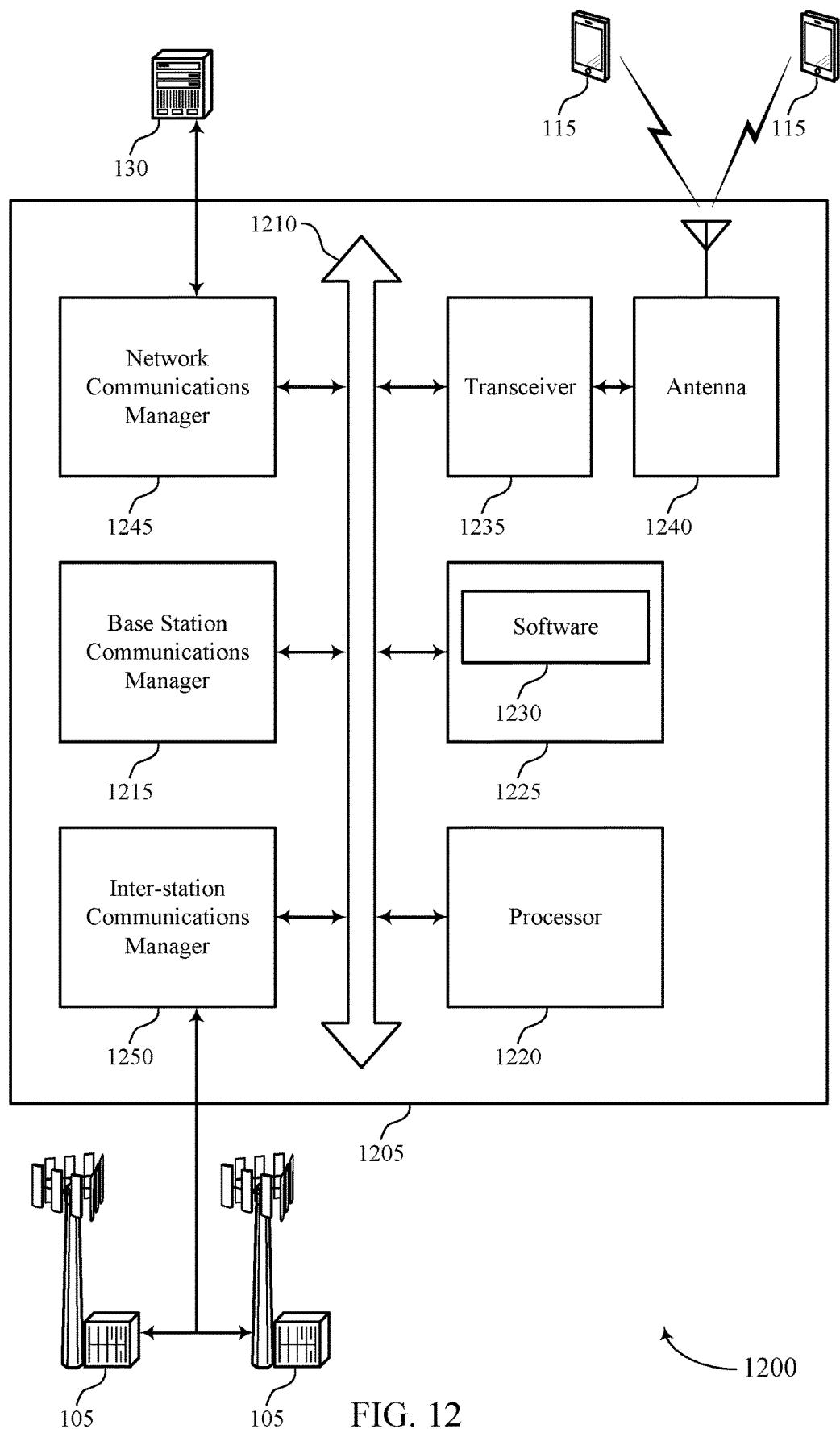
FIG. 12 illustrates a block diagram of a system including a base station that supports uplink control information mapping on a shortened uplink shared channel in accordance with aspects of the present disclosure.

FIG. 12 shows a diagram of a system 1200 including a device 1205 that supports UCI mapping on a shortened uplink shared channel in accordance with aspects of the present disclosure. Device 1205 may be an example of or include the components of base station 105 as described above, e.g., with reference to FIG. 1. Device 1205 may include components for bi-directional voice and data communications including components for transmitting and receiving communications, including base station communications manager 1215, processor 1220, memory 1225, software 1230, transceiver 1235, antenna 1240, network communications manager 1245, and inter-station communications manager 1250. These components may be in electronic communication via one or more buses (e.g., bus 1210). Device 1205 may communicate wirelessly with one or more UEs 115.

Processor 1220 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof). In some cases, processor 1220 may be configured to operate a memory array using a memory controller. In other cases, a memory controller may be integrated into processor 1220. Processor 1220 may be configured to execute computer-readable instructions stored in a memory to perform various functions (e.g., functions or tasks supporting UCI mapping on a shortened uplink shared channel).

Memory 1225 may include RAM and ROM. The memory 1225 may store computer-readable, computer-executable software 1230 including instructions that, when executed, cause the processor to perform various functions described herein. In some cases, the memory 1225 may contain, among other things, a BIOS which may control basic hardware or software operation such as the interaction with peripheral components or devices.

Software 1230 may include code to implement aspects of the present disclosure, including code to support UCI mapping on a shortened uplink shared channel. Software 1230 may be stored in a non-transitory computer-readable medium such as system memory or other memory. In some cases, the software 1230 may not be directly executable by the processor but may cause a computer (e.g., when compiled and executed) to perform functions described herein.

Transceiver 1235 may communicate bi-directionally, via one or more antennas, wired, or wireless links as described above. For example, the transceiver 1235 may represent a wireless transceiver and may communicate bi-directionally with another wireless transceiver. The transceiver 1235 may also include a modem to modulate the packets and provide the modulated packets to the antennas for transmission, and to demodulate packets received from the antennas.

In some cases, the wireless device may include a single antenna 1240. However, in some cases the device may have more than one antenna 1240, which may be capable of concurrently transmitting or receiving multiple wireless transmissions.

Network communications manager 1245 may manage communications with the core network (e.g., via one or more wired backhaul links). For example, the network communications manager 1245 may manage the transfer of data communications for client devices, such as one or more UEs 115.

Inter-station communications manager 1250 may manage communications with other base station 105, and may include a controller or scheduler for controlling communications with UEs 115 in cooperation with other base stations 105. For example, the inter-station communications manager 1250 may coordinate scheduling for transmissions to UEs 115 for various interference mitigation techniques such as beamforming or joint transmission. In some examples, inter-station communications manager 1250 may provide an X2 interface within a Long Term Evolution (LTE)/LTE-A wireless communication network technology to provide communication between base stations 105.

Figure 13:
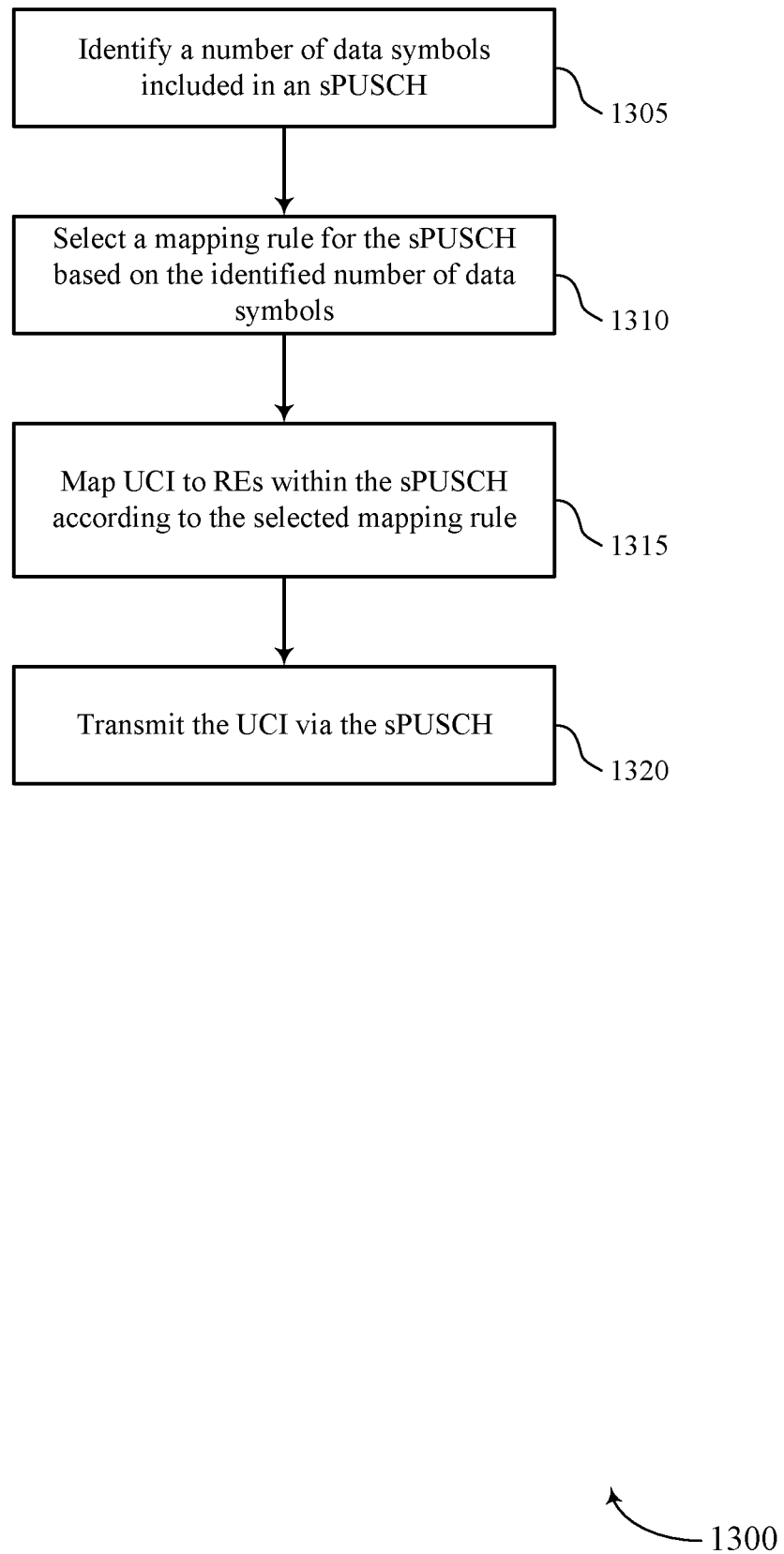
FIGS. 13 through 14 illustrate methods for uplink control information mapping on a shortened uplink shared channel in accordance with aspects of the present disclosure.

FIG. 13 shows a flowchart illustrating a method 1300 for UCI mapping on a shortened uplink shared channel in accordance with aspects of the present disclosure. The operations of method 1300 may be implemented by a UE 115 or its components as described herein. For example, the operations of method 1300 may be performed by a UE communications manager as described with reference to FIGS. 5 through 8. In some examples, a UE 115 may execute a set of codes to control the functional elements of the device to perform the functions described below. Additionally, or alternatively, the UE 115 may perform aspects of the functions described below using special-purpose hardware.

At 1305 the UE 115 may identify a number of data symbols included in an sPUSCH. The operations of 1305 may be performed according to the methods described herein. In certain examples, aspects of the operations of 1305 may be performed by an sPUSCH format component as described with reference to FIGS. 5 through 8.

At 1310 the UE 115 may select a mapping rule for the sPUSCH based at least in part on the identified number of data symbols. The operations of 1310 may be performed according to the methods described herein. In certain examples, aspects of the operations of 1310 may be performed by a UCI mapping component as described with reference to FIGS. 5 through 8.

At 1315 the UE 115 may map UCI to REs within the sPUSCH according to the selected mapping rule. The operations of 1315 may be performed according to the methods described herein. In certain examples, aspects of the operations of 1315 may be performed by a UCI mapping component as described with reference to FIGS. 5 through 8.

At 1320 the UE 115 may transmit the UCI via the sPUSCH. The operations of 1320 may be performed according to the methods described herein. In certain examples, aspects of the operations of 1320 may be performed by an sPUSCH manager as described with reference to FIGS. 5 through 8.

Figure 14:
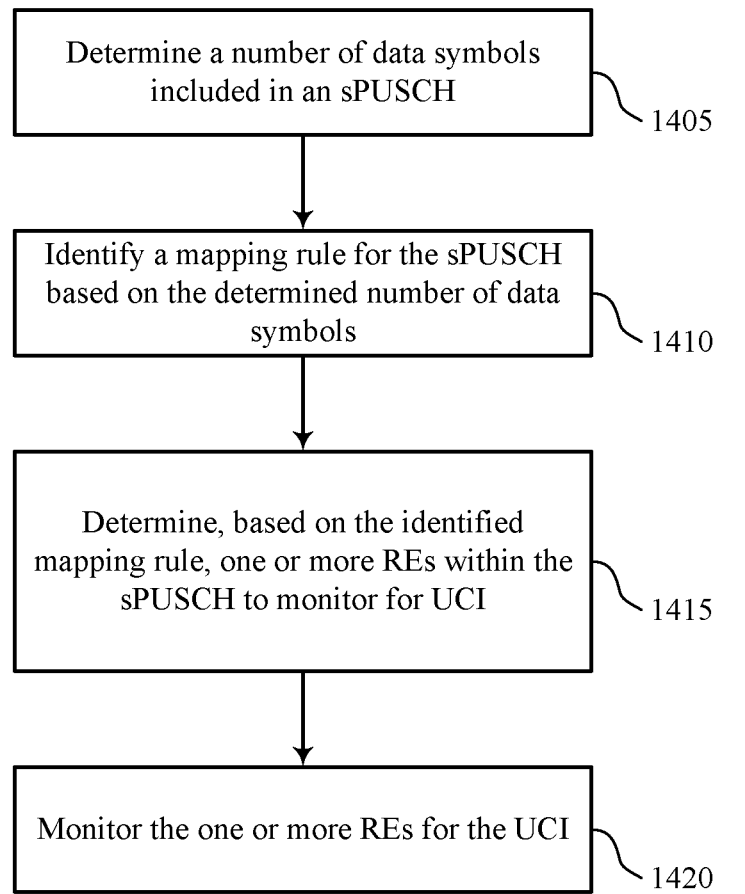

FIG. 14 shows a flowchart illustrating a method 1400 for UCI mapping on a shortened uplink shared channel in accordance with aspects of the present disclosure. The operations of method 1400 may be implemented by a base station 105 or its components as described herein. For example, the operations of method 1400 may be performed by a base station communications manager as described with reference to FIGS. 9 through 12. In some examples, a base station 105 may execute a set of codes to control the functional elements of the device to perform the functions described below. Additionally, or alternatively, the base station 105 may perform aspects of the functions described below using special-purpose hardware.

At 1405 the base station 105 may determine a number of data symbols included in an sPUSCH. The operations of 1405 may be performed according to the methods described herein. In certain examples, aspects of the operations of 1405 may be performed by an sPUSCH format component as described with reference to FIGS. 9 through 12.

At 1410 the base station 105 may identify a mapping rule for the sPUSCH based at least in part on the determined number of data symbols. The operations of 1410 may be performed according to the methods described herein. In certain examples, aspects of the operations of 1410 may be performed by a UCI mapping component as described with reference to FIGS. 9 through 12.

At 1415 the base station 105 may determine, based at least in part on the identified mapping rule, one or more REs within the sPUSCH to monitor for UCI. The operations of 1415 may be performed according to the methods described herein. In certain examples, aspects of the operations of 1415 may be performed by a UCI mapping component as described with reference to FIGS. 9 through 12.

At 1420 the base station 105 may monitor the one or more REs for the UCI. The operations of 1420 may be performed according to the methods described herein. In certain examples, aspects of the operations of 1420 may be performed by an sPUSCH manager as described with reference to FIGS. 9 through 12.

It should be noted that the methods described above describe possible implementations, and that the operations and the steps may be rearranged or otherwise modified and that other implementations are possible. Further, aspects from two or more of the methods may be combined.

Techniques described herein may be used for various wireless communications systems such as code division multiple access (CDMA), time division multiple access (TDMA), frequency division multiple access (FDMA), orthogonal frequency division multiple access (OFDMA), single carrier frequency division multiple access (SC-FDMA), and other systems. A CDMA system may implement a radio technology such as CDMA2000, Universal Terrestrial Radio Access (UTRA), etc. CDMA2000 covers IS-2000, IS-95, and IS-856 standards. IS-2000 Releases may be commonly referred to as CDMA2000 1x, 1x, etc. IS-856 (TIA-856) is commonly referred to as CDMA2000 1xEV-DO, High Rate Packet Data (HRPD), etc. UTRA includes Wideband CDMA (WCDMA) and other variants of CDMA. A TDMA system may implement a radio technology such as Global System for Mobile Communications (GSM).

An OFDMA system may implement a radio technology such as Ultra Mobile Broadband (UMB), Evolved UTRA (E-UTRA), Institute of Electrical and Electronics Engineers (IEEE) 802.11 (Wi-Fi), IEEE 802.16 (WiMAX), IEEE 802.20, Flash-OFDM, etc. UTRA and E-UTRA are part of Universal Mobile Telecommunications System (UMTS). LTE and LTE-A are releases of UMTS that use E-UTRA. UTRA, E-UTRA, UMTS, LTE, LTE-A, NR, and GSM are described in documents from the organization named "3rd Generation Partnership Project" (3GPP). CDMA2000 and UMB are described in documents from an organization named "3rd Generation Partnership Project 2" (3GPP2). The techniques described herein may be used for the systems and radio technologies mentioned above as well as other systems and radio technologies. While aspects of an LTE or an NR system may be described for purposes of example, and LTE or NR terminology may be used in much of the description, the techniques described herein are applicable beyond LTE or NR applications.

A macro cell generally covers a relatively large geographic area (e.g., several kilometers in radius) and may allow unrestricted access by UEs 115 with service subscriptions with the network provider. A small cell may be associated with a lower-powered base station 105, as compared with a macro cell, and a small cell may operate in the same or different (e.g., licensed, unlicensed, etc.) frequency bands as macro cells. Small cells may include pico cells, femto cells, and micro cells according to various examples. A pico cell, for example, may cover a small geographic area and may allow unrestricted access by UEs 115 with service subscriptions with the network provider. A femto cell may also cover a small geographic area (e.g., a home) and may provide restricted access by UEs 115 having an association with the femto cell (e.g., UEs 115 in a closed subscriber group (CSG), UEs 115 for users in the home, and the like). An eNB for a macro cell may be referred to as a macro eNB. An eNB for a small cell may be referred to as a small cell eNB, a pico eNB, a femto eNB, or a home eNB. An eNB may support one or multiple (e.g., two, three, four, and the like) cells, and may also support communications using one or multiple component carriers.

The wireless communications system 100 or systems described herein may support synchronous or asynchronous operation. For synchronous operation, the base stations 105 may have similar frame timing, and transmissions from different base stations 105 may be approximately aligned in time. For asynchronous operation, the base stations 105 may have different frame timing, and transmissions from different base stations 105 may not be aligned in time. The techniques described herein may be used for either synchronous or asynchronous operations.

Information and signals described herein may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a DSP, an ASIC, a FPGA or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described above can be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that can be accessed by a general purpose or special purpose computer. By way of example, and not limitation, non-transitory computer-readable media may comprise RAM, ROM, electrically erasable programmable read only memory (EEPROM), flash memory, compact disk (CD) ROM or other optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, the term "and/or," when used in a list of two or more items, means that any one of the listed items can be employed by itself, or any combination of two or more of the listed items can be employed. For example, if a composition is described as containing components A, B, and/or C, the composition can contain A alone; B alone; C alone; A and B in combination; A and C in combination; B and C in combination; or A, B, and C in combination. Also, as used herein, including in the claims, "or" as used in a list of items (for example, a list of items prefaced by a phrase such as "at least one of" or "one or more of") indicates an inclusive list such that, for example, a phrase referring to "at least one of" a list of items refers to any combination of those items, including single members. As an example, "at least one of: A, B, or C" is intended to cover A, B, C, A-B, A-C, B-C, and A-B-C, as well as any combination with multiples of the same element (e.g., A-A A-A-A, A-A-B, A-A-C, A-B-B, A-C-C, B-B, B-B-B, B-B-C, C-C, and C-C-C or any other ordering of A, B, and C).

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an exemplary step that is described as "based on condition A" may be based on both a condition A and a condition B without departing from the scope of the present disclosure. In other words, as used herein, the phrase "based on" shall be construed in the same manner as the phrase "based at least in part on."

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "exemplary" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and devices are shown in block diagram form in order to avoid obscuring the concepts of the described examples.

The description herein is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

What is claimed is:

1. A method for wireless communication, comprising:
identifying a number of data symbols included in a shortened physical uplink shared channel (sPUSCH), wherein the identified number of data symbols is two;
selecting a mapping rule for the sPUSCH based at least in part on the identified number of data symbols;
mapping uplink control information (UCI) to resource elements (REs) within the sPUSCH according to the selected mapping rule by:
mapping acknowledgement (ACK/NACK) data included within the UCI to a first data symbol of the sPUSCH, the first data symbol of the sPUSCH selected to necessarily be adjacent in time to a reference symbol allocated to reference data for decoding the sPUSCH; and
mapping rank indication (RI) data included within the UCI to a second data symbol of the sPUSCH; and
transmitting the UCI via the sPUSCH.

2. The method of claim 1, wherein the reference symbol is within a same shortened transmission time interval (sTTI) as the first data symbol of the sPUSCH.

3. The method of claim 1, wherein the first data symbol of the sPUSCH is within a first shortened transmission time interval (sTTI) and the reference symbol is within a second sTTI that is different from the first sTTI.

4. The method of claim 1, wherein the reference data comprises demodulation reference signal (DMRS) data.

5. The method of claim 1, further comprising:
mapping the ACK/NACK data included within the UCI to one or more REs comprising a lowest-frequency RE within the first data symbol.

6. The method of claim 1, further comprising:
mapping the RI data included within the UCI to one or more REs comprising a lowest-frequency RE within the second data symbol.

7. The method of claim 1, further comprising:
mapping channel quality indication (CQI) data included within the UCI to one or more REs comprising a highest-frequency RE within the first data symbol, within the second data symbol, or within both the first data symbol and the second data symbol.

8. The method of claim 1, wherein mapping the UCI to REs within the sPUSCH according to the selected mapping rule further comprises:
mapping the CQI data and the RI data included within the UCI in accordance with a rate-matching procedure; and
mapping the ACK/NACK data within the UCI in accordance with a puncturing procedure.

9. A method for wireless communication, comprising:
identifying a number of data symbols included in a shortened physical uplink shared channel (sPUSCH), wherein the identified number of data symbols is one;
selecting a mapping rule for the sPUSCH based at least in part on the identified number of data symbols;
mapping uplink control information (UCI) to resource elements (REs) within the sPUSCH according to the selected mapping rule by:
mapping acknowledgement (ACK/NACK) data included within the UCI in accordance with a first priority; and
mapping rank indication (RI) data included within the UCI in accordance with a second priority that is lower than the first priority;
determining that a number of REs included in a data symbol of the sPUSCH is insufficient to carry all the RI data included within the UCI and all the ACK/NACK data included within the UCI;
puncturing at least a portion of the RI data included within the UCI in favor of at least a portion of the ACK/NACK data included within the UCI; and
transmitting the UCI via the sPUSCH.

10. The method of claim 9, wherein mapping the UCI to REs within the sPUSCH according to the selected mapping rule further comprises:
mapping channel quality indication (CQI) data included within the UCI in accordance with a third priority that is lower than the second priority; and
mapping user data scheduled for the sPUSCH in accordance with a fourth priority that is lower than the third priority.

11. The method of claim 10, wherein mapping the UCI to REs within the sPUSCH according to the selected mapping rule further comprises:
mapping the CQI data and the RI data included within the UCI in accordance with a rate-matching procedure; and
mapping the ACK/NACK data within the UCI in accordance with a puncturing procedure.

12. A method for wireless communication, comprising:
identifying a number of data symbols included in a shortened physical uplink shared channel (sPUSCH), wherein the identified number of data symbols is one;
selecting a mapping rule for the sPUSCH based at least in part on the identified number of data symbols;
mapping uplink control information (UCI) to resource elements (REs) within the sPUSCH according to the selected mapping rule by:
mapping acknowledgement (ACK/NACK) data included within the UCI in accordance with a first priority, wherein a starting position for the ACK/NACK data included within the UCI is based at least in part on a number of REs required to carry the ACK/NACK data included within the UCI and at least in part on a total number of REs included in the sPUSCH;
mapping rank indication (RI) data included within the UCI in accordance with a second priority that is lower than the first priority; and
transmitting the UCI via the sPUSCH.

13. The method of claim 12, wherein mapping the UCI to REs within the sPUSCH according to the selected mapping rule further comprises:
mapping channel quality indication (CQI) data included within the UCI to one or more REs comprising a first fixed starting position; and mapping rank indication (RI) data included within the UCI to one or more REs comprising a second fixed starting position.

14. The method of claim 13, wherein the first fixed starting position is a highest-frequency RE within a data symbol of the sPUSCH.

15. The method of claim 13, wherein the second fixed starting position is a lowest-frequency RE within a data symbol of the sPUSCH.

16. A method for wireless communication, comprising:
identifying a number of data symbols included in a shortened physical uplink shared channel (sPUSCH), wherein the identified number of data symbols is one;
selecting a mapping rule for the sPUSCH based at least in part on the identified number of data symbols;
mapping uplink control information (UCI) to resource elements (REs) within the sPUSCH according to the selected mapping rule by:
mapping acknowledgement (ACK/NACK) data included within the UCI in accordance with a first priority; and
mapping rank indication (RI) data included within the UCI in accordance with a second priority that is lower than the first priority;
determining that a number of REs included in a data symbol of the sPUSCH is sufficient to carry all the RI data included within the UCI and all the ACK/NACK data included within the UCI;
mapping the ACK/NACK data included within the UCI to one or more REs comprising a third starting position, the third starting position adjacent in frequency to a last RE allocated to RI data; and
transmitting the UCI via the sPUSCH.

17. A method for wireless communication, comprising:
identifying a number of data symbols included in a shortened physical uplink shared channel (sPUSCH), wherein the identified number of data symbols is one;
selecting a mapping rule for the sPUSCH based at least in part on the identified number of data symbols;
mapping uplink control information (UCI) to resource elements (REs) within the sPUSCH according to the selected mapping rule by:
mapping acknowledgement (ACK/NACK) data included within the UCI in accordance with a first priority; and
mapping rank indication (RI) data included within the UCI in accordance with a second priority that is lower than the first priority;
determining that a number of REs included in a data symbol of the sPUSCH is sufficient to carry all the RI data included within the UCI and all the ACK/NACK data included within the UCI;
determining that the number of REs included in the data symbol of the sPUSCH is insufficient to carry all the RI data included within the UCI, all the ACK/NACK data included within the UCI, and all channel quality indication (CQI) data included within the UCI;
puncturing at least a portion of the CQI data included within the UCI in favor of at least a portion of the ACK/NACK data included within the UCI; and
transmitting the UCI via the sPUSCH.

18. A method for wireless communication, comprising:
identifying a number of data symbols included in a shortened physical uplink shared channel (sPUSCH), wherein the identified number of data symbols is one;
selecting a mapping rule for the sPUSCH based at least in part on the identified number of data symbols;
mapping uplink control information (UCI) to resource elements (REs) within the sPUSCH according to the selected mapping rule by:
mapping acknowledgement (ACK/NACK) data included within the UCI in accordance with a first priority; and
mapping rank indication (RI) data included within the UCI in accordance with a second priority that is lower than the first priority;
determining that a number of REs included in a data symbol of the sPUSCH is sufficient to carry all the RI data included within the UCI, all the ACK/NACK data included within the UCI, and all channel quality indication (CQI) data included within the UCI;
mapping user data scheduled for the sPUSCH to one or more REs included in the data symbol of the sPUSCH; and
transmitting the UCI via the sPUSCH.

19. A method for wireless communication, comprising:
determining a number of data symbols included in a shortened physical uplink shared channel (sPUSCH);
identifying a mapping rule for the sPUSCH based at least in part on the determined number of data symbols;
determining, based at least in part on the identified mapping rule, one or more resource elements (REs) within the sPUSCH to monitor for uplink control information (UCI); and
monitoring the one or more REs for the UCI.

20. The method of claim 19, wherein:
the determined number of data symbols is one; and wherein
determining, based at least in part on the identified mapping rule, one or more REs within the sPUSCH to monitor for UCI comprises:
determining one or more REs comprising a fixed starting position within a data symbol of the sPUSCH to monitor for rank indication (RI) data.

21. The method of claim 20, further comprising:
determining that a RE corresponding to the fixed starting position comprises RI data;
identifying a second RE within the data symbol of the sPUSCH that is nearest in frequency to the fixed starting position and that lacks RI data; and
monitoring the second RE for acknowledgement (ACK/NACK) data.

22. The method of claim 20, further comprising:
determining that a RE corresponding to the fixed starting position lacks RI data; and
determining whether the RE corresponding to the fixed starting position comprises acknowledgement (ACK/NACK) data.

23. The method of claim 20, wherein the fixed starting position is a lowest-frequency RE within the data symbol of the sPUSCH.

24. The method of claim 20, further comprising:
determining one or more REs comprising a second fixed starting position within the data symbol of the sPUSCH to monitor for channel quality indication (CQI) data.

25. The method of claim 24, wherein the second fixed starting position is a highest-frequency RE within the data symbol of the sPUSCH.

26. The method of claim 19, wherein:
the determined number of data symbols is two; and wherein determining, based at least in part on the identified mapping rule, one or more REs within the sPUSCH to monitor for UCI comprises:

determining a reference symbol allocated to reference data for decoding the sPUSCH;
  determining a first data symbol of the sPUSCH, the first data symbol of the sPUSCH adjacent in time to the reference symbol, to monitor for acknowledgement (ACK/NACK) data; and
  determining a second data symbol of the sPUSCH to monitor for rank indication (RI) data.

27. The method of claim 26, wherein the reference symbol is within a same shortened transmission time interval (sTTI) as the first data symbol of the sPUSCH.

28. The method of claim 26, wherein the first data symbol of the sPUSCH is within a first shortened transmission time interval (sTTI) and the reference symbol is within a second sTTI that is different from the first sTTI.

29. The method of claim 26, wherein the reference data comprises demodulation reference signal (DMRS) data.

30. The method of claim 26, further comprising:
  determining one or more REs comprising a lowest-frequency RE within the first data symbol to monitor for the ACK/NACK data.

31. The method of claim 26, further comprising:
  determining one or more REs comprising a lowest-frequency RE within the second data symbol to monitor for the RI data.

32. The method of claim 26, further comprising:
  determining one or more REs comprising a highest-frequency RE within the first data symbol, within the second data symbol, or within both the first data symbol and the second data symbol to monitor for channel quality indication (CQI) data.

33. An apparatus for wireless communication, comprising:
  means for determining a number of data symbols included in a shortened physical uplink shared channel (sPUSCH);
  means for identifying a mapping rule for the sPUSCH based at least in part on the determined number of data symbols;
  means for determining, based at least in part on the identified mapping rule, one or more resource elements (REs) within the sPUSCH to monitor for uplink control information (UCI); and
  means for monitoring the one or more REs for the UCI.

34. An apparatus for wireless communication, comprising:
  a processor;
  memory in electronic communication with the processor; and
  instructions stored in the memory and executable by the processor to cause the apparatus to:
    identify a number of data symbols included in a shortened physical uplink shared channel (sPUSCH), wherein the identified number of data symbols is one;
    select a mapping rule for the sPUSCH based at least in part on the identified number of data symbols;
    map uplink control information (UCI) to resource elements (REs) within the sPUSCH according to the selected mapping rule by:
      mapping acknowledgement (ACK/NACK) data included within the UCI in accordance with a first priority; and
      mapping rank indication (RI) data included within the UCI in accordance with a second priority that is lower than the first priority;
    determine that a number of REs included in a data symbol of the sPUSCH is insufficient to carry all the RI data included within the UCI and all the ACK/NACK data included within the UCI;
    puncture at least a portion of the RI data included within the UCI in favor of at least a portion of the ACK/NACK data included within the UCI; and
    transmit the UCI via the sPUSCH.

35. An apparatus for wireless communication, comprising:
  a processor;
  memory in electronic communication with the processor; and
  instructions stored in the memory and executable by the processor to cause the apparatus to:
    determine a number of data symbols included in a shortened physical uplink shared channel (sPUSCH);
    identify a mapping rule for the sPUSCH based at least in part on the determined number of data symbols;
    determine, based at least in part on the identified mapping rule, one or more resource elements (REs) within the sPUSCH to monitor for uplink control information (UCI); and
    monitor the one or more REs for the UCI.

36. A non-transitory computer-readable medium storing code for wireless communication, the code comprising instructions executable by a processor to:
  determine a number of data symbols included in a shortened physical uplink shared channel (sPUSCH);
  identify a mapping rule for the sPUSCH based at least in part on the determined number of data symbols;
  determine, based at least in part on the identified mapping rule, one or more resource elements (REs) within the sPUSCH to monitor for uplink control information (UCI); and
  monitor the one or more REs for the UCI.

37. An apparatus for wireless communication, comprising:
  a processor;
  memory in electronic communication with the processor; and
  instructions stored in the memory and executable by the processor to cause the apparatus to:
    identify a number of data symbols included in a shortened physical uplink shared channel (sPUSCH), wherein the identified number of data symbols is one;
    select a mapping rule for the sPUSCH based at least in part on the identified number of data symbols;
    map uplink control information (UCI) to resource elements (REs) within the sPUSCH according to the selected mapping rule by:
      mapping acknowledgement (ACK/NACK) data included within the UCI in accordance with a first priority; and
      mapping rank indication (RI) data included within the UCI in accordance with a second priority that is lower than the first priority;
    determine that a number of REs included in a data symbol of the sPUSCH is sufficient to carry all the RI data included within the UCI and all the ACK/NACK data included within the UCI;
    determine that the number of REs included in the data symbol of the sPUSCH is insufficient to carry all the RI data included within the UCI, all the ACK/NACK data included within the UCI, and all channel quality indication (CQI) data included within the UCI;
puncture at least a portion of the CQI data included within the UCI in favor of at least a portion of the ACK/NACK data included within the UCI; and
transmit the UCI via the sPUSCH.

* * * * *